US012641676B2

(12) United States Patent
Xu et al.

(10) Patent No.: US 12,641,676 B2
(45) Date of Patent: May 26, 2026

(54) RADIO FREQUENCY SENSING WITH POWER SAVINGS

(71) Applicant: QUALCOMM Incorporated, San Diego, CA (US)

(72) Inventors: Huilin Xu, Temecula, CA (US); Weimin Duan, San Diego, CA (US); Shuanshuan Wu, San Diego, CA (US); Diana Maamari, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/340,074

(22) Filed: Jun. 23, 2023

(65) Prior Publication Data

US 2024/0430977 A1     Dec. 26, 2024

(51) Int. Cl.
*H04W 76/28*          (2018.01)

(52) U.S. Cl.
CPC .................................... *H04W 76/28* (2018.02)

(58) Field of Classification Search
CPC ............. H04W 76/28; H04W 52/0229; H04W 52/0216; Y02D 30/70; G01S 7/006; G01S 13/003
See application file for complete search history.

(56) References Cited

U.S. PATENT DOCUMENTS

| | | | |
|---|---|---|---|
| 2016/0234078 A1* | 8/2016 | Jana | H04L 47/25 |
| 2017/0202052 A1 | 7/2017 | Xu et al. | |
| 2022/0346180 A1* | 10/2022 | Tseng | H04W 76/14 |
| 2023/0089794 A1* | 3/2023 | Behnamfar | H04W 52/367 |
| | | | 370/329 |

FOREIGN PATENT DOCUMENTS

| | | | | |
|---|---|---|---|---|
| KR | 20210141335 A | * | 11/2021 | H04B 1/3816 |
| WO | 2022082706 A1 | | 4/2022 | |

OTHER PUBLICATIONS

International Search Report and Written Opinion—PCT/US2024/026750—ISA/EPO—Sep. 11, 2024.

* cited by examiner

*Primary Examiner* — Ayanah S George
(74) *Attorney, Agent, or Firm* — QUALCOMM Incorporated

(57) ABSTRACT

Techniques are provided for aligning radio frequency (RF) sensing operations with base station discontinuous reception (DRX) and discontinuous transmission (DTX) cycles. An example method for performing RF sensing operations with a wireless node according to the disclosure includes receiving discontinuous reception or discontinuous transmission information for the wireless node, determining one or more on periods and one or more off periods based on the discontinuous reception or the discontinuous transmission information, performing radio frequency sensing operations with the wireless node during the one or more on periods, and ceasing radio frequency sensing operations with the wireless node during the one or more off periods.

14 Claims, 20 Drawing Sheets

250

270

LMF

272

SLP

260

5GC

266

264

AMF

SMF

UPF

262

265

265

263

263

220

NEW RAN

224 ng-eNB gNB

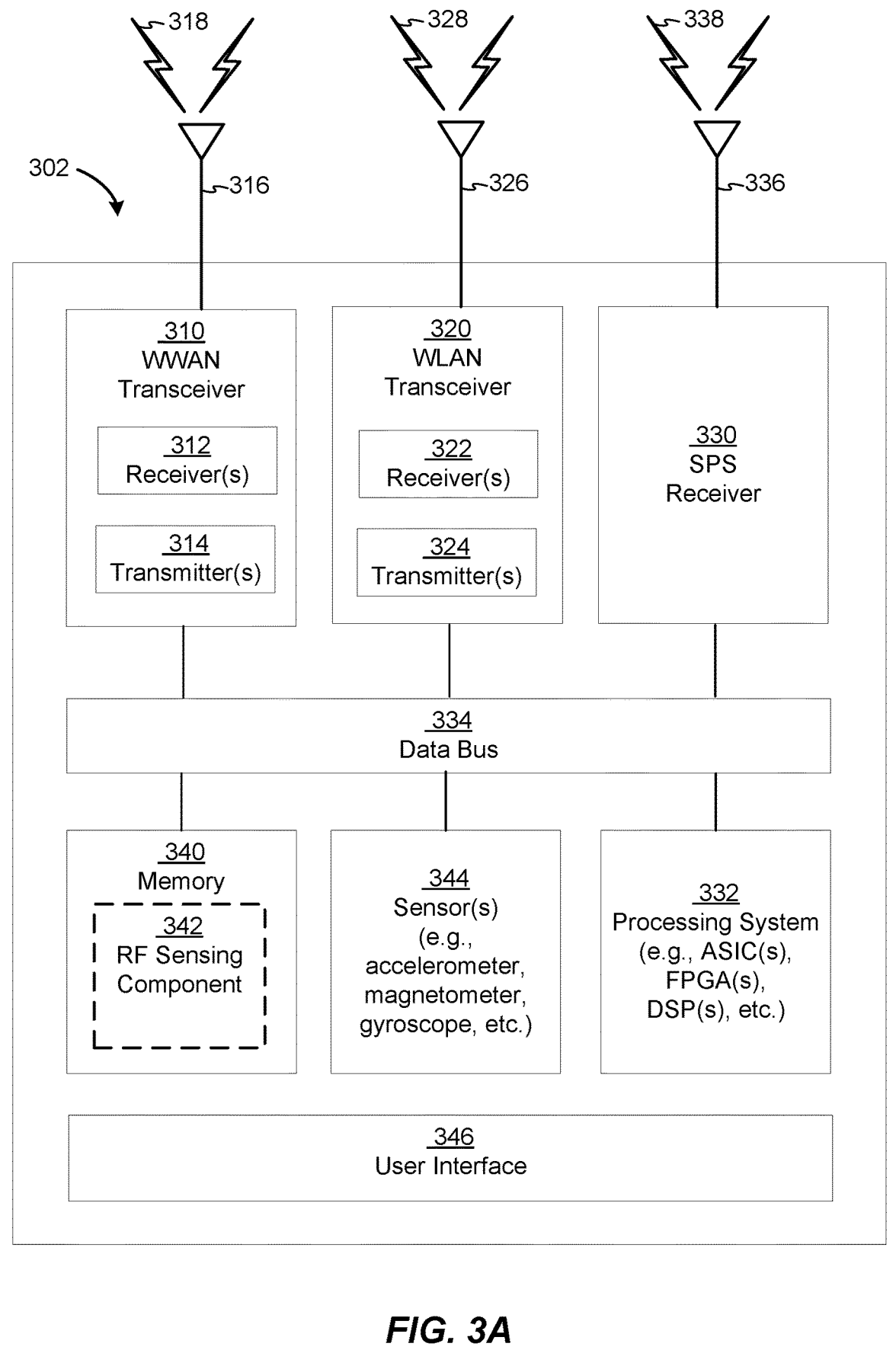

310
WWAN
Transceiver

312
Receiver(s)

314
Transmitter(s)

320
WLAN
Transceiver

322
Receiver(s)

324
Transmitter(s)

330
SPS
Receiver

334
Data Bus

340
Memory

342
RF Sensing
Component

344
Sensor(s)
(e.g.,
accelerometer,
magnetometer,
gyroscope, etc.)

332
Processing System
(e.g., ASIC(s),
FPGA(s),
DSP(s), etc.)

346
User Interface

*FIG. 3A*

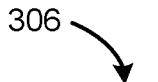
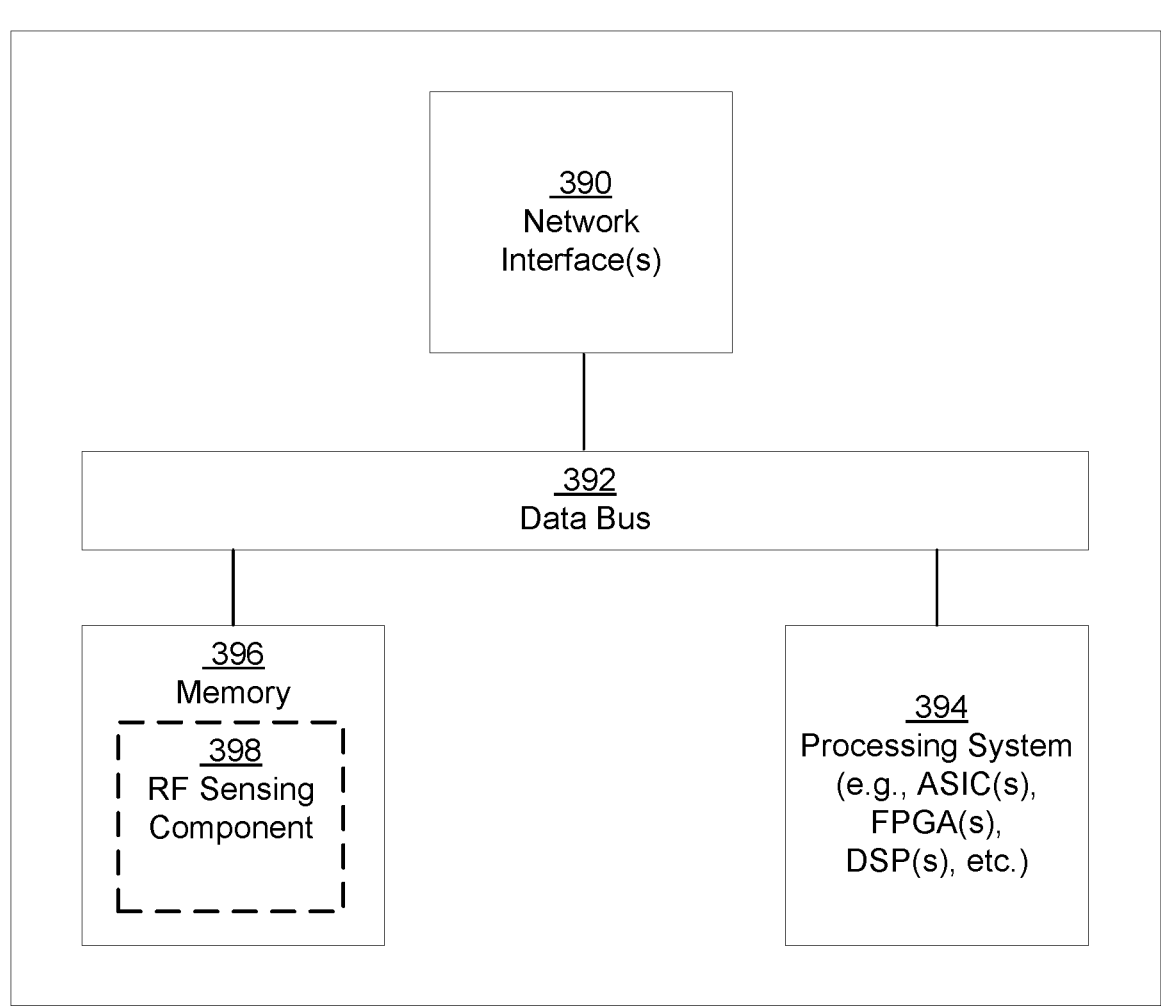
FIG. 3C

Transmit and Receive

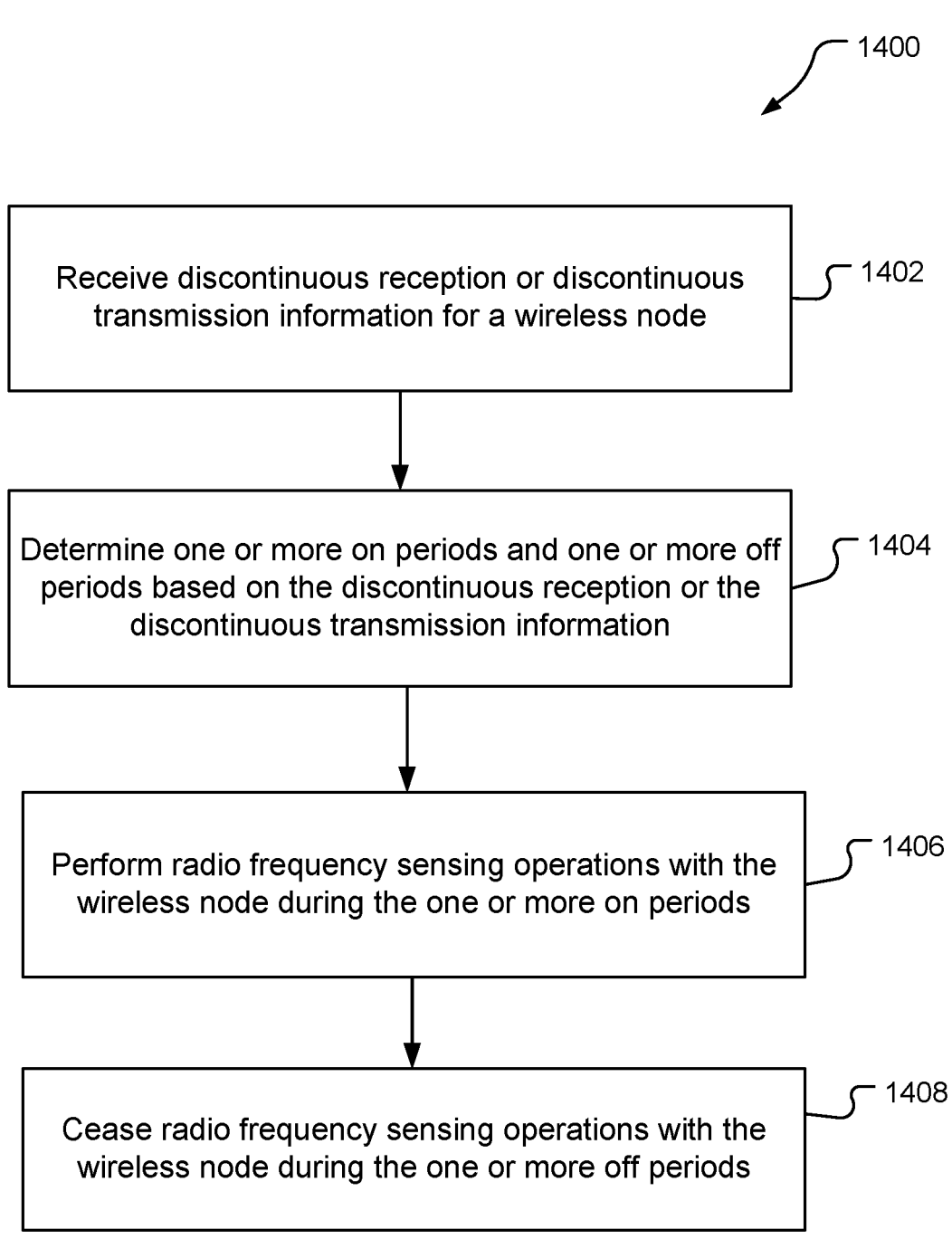

1400

Receive discontinuous reception or discontinuous transmission information for a wireless node    1402

Determine one or more on periods and one or more off periods based on the discontinuous reception or the discontinuous transmission information    1404

Perform radio frequency sensing operations with the wireless node during the one or more on periods    1406

Cease radio frequency sensing operations with the wireless node during the one or more off periods    1408

*FIG. 14*

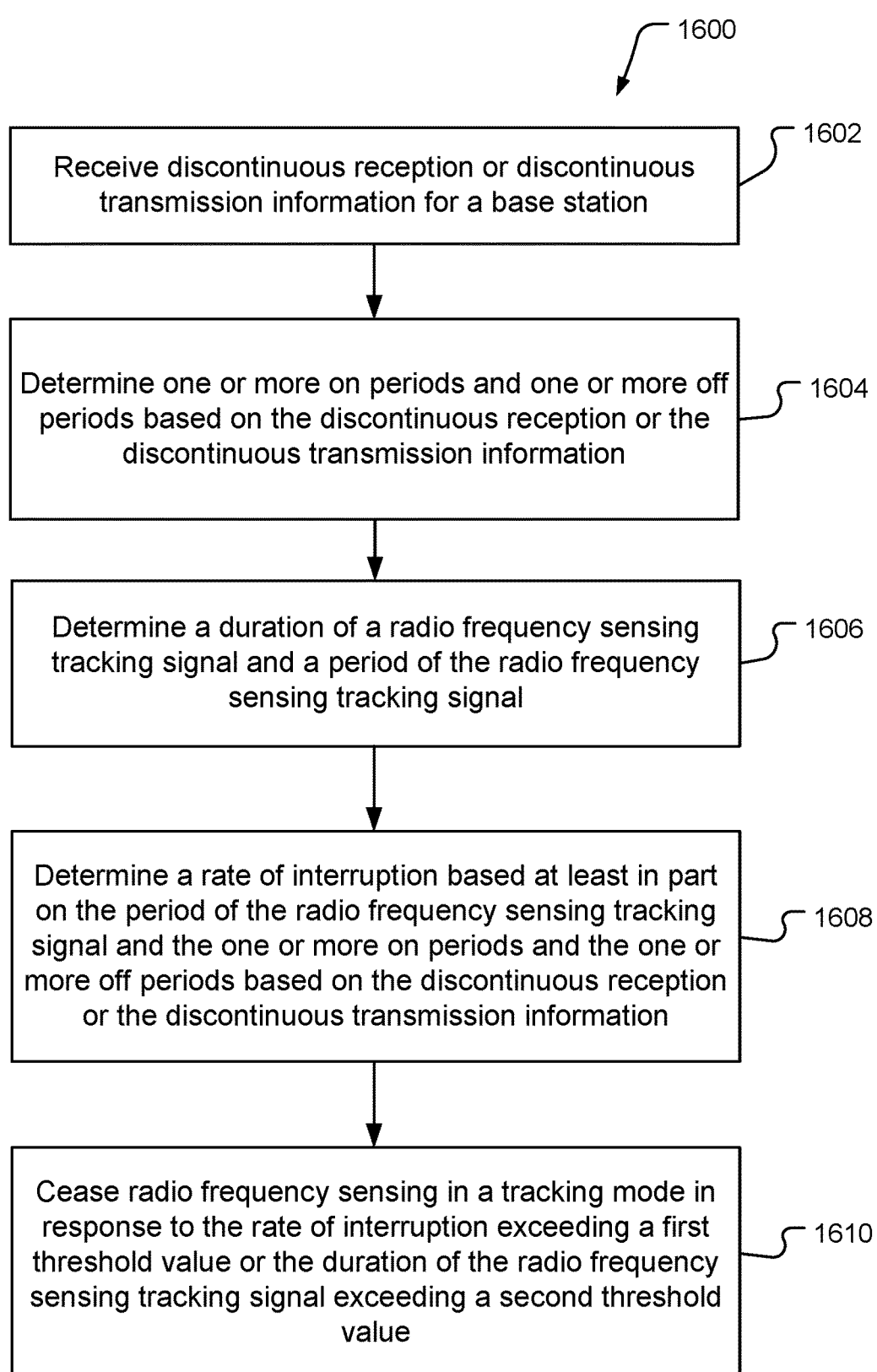

1600

Receive discontinuous reception or discontinuous transmission information for a base station — 1602

Determine one or more on periods and one or more off periods based on the discontinuous reception or the discontinuous transmission information — 1604

Determine a duration of a radio frequency sensing tracking signal and a period of the radio frequency sensing tracking signal — 1606

Determine a rate of interruption based at least in part on the period of the radio frequency sensing tracking signal and the one or more on periods and the one or more off periods based on the discontinuous reception or the discontinuous transmission information — 1608

Cease radio frequency sensing in a tracking mode in response to the rate of interruption exceeding a first threshold value or the duration of the radio frequency sensing tracking signal exceeding a second threshold value — 1610

*FIG. 16*

RADIO FREQUENCY SENSING WITH POWER SAVINGS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of RF signals for wireless communication between network nodes, such as base stations, user equipment (UEs), vehicles, factory automation machinery, and the like. However, the RF signals may also be used for RF sensing applications such as autonomous driving, intruder detection, gesture recognition, beam management, and other macro and micro sensing applications. In some implementations, network base stations may be configured to participate in bistatic RF sensing operations with neighboring UEs. Power savings configurations may impact the availability of the base stations to participate in such RF sensing operations.

SUMMARY

An example method for performing radio frequency (RF) sensing operations with a wireless node according to the disclosure includes receiving discontinuous reception or discontinuous transmission information for the wireless node, determining one or more on periods and one or more off periods based on the discontinuous reception or the discontinuous transmission information, performing radio frequency sensing operations with the wireless node during the one or more on periods, and ceasing radio frequency sensing operations with the wireless node during the one or more off periods.

An example method for performing radio frequency (RF) sensing operations with a mobile device according to the disclosure includes providing discontinuous reception or discontinuous transmission information to the mobile device, performing radio frequency sensing operations with the mobile device during an on period included in the discontinuous reception or discontinuous transmission information, and ceasing radio frequency sensing operations during an off period included in the discontinuous reception or discontinuous transmission information.

An example method for performing bistatic radio frequency sensing operations in a tracking mode according to the disclosure includes receiving discontinuous reception or discontinuous transmission information for a base station, determining one or more on periods and one or more off periods based on the discontinuous reception or the discontinuous transmission information, determining a duration of a radio frequency sensing tracking signal and a period of the radio frequency sensing tracking signal, determining a rate of interruption based at least in part on the period of the radio frequency sensing tracking signal and the one or more on periods and the one or more off periods based on the discontinuous reception or the discontinuous transmission information, and ceasing radio frequency sensing in the tracking mode in response to the rate of interruption exceeding a first threshold value or the duration of the radio frequency sensing tracking signal exceeding a second threshold value.

Items and/or techniques described herein may provide one or more of the following capabilities, as well as other capabilities not mentioned. A wireless node may be capable of transmitting and/or receiving radio frequency (RF) sensing signals. The wireless node may utilize the same receivers for both communications and RF sensing operations. A base station may utilize a discontinuous reception (DRX) mode or a discontinuous transmission (DTX) mode to save power. The DRX and DTX modes may include on periods and off periods. The base station may not be able to participate in RF sensing operations during the off periods. A user equipment may perform bistatic RF sensing operations with the base station during the on periods. The user equipment may switch to bistatic RF sensing operations with a neighboring wireless node (e.g., base station or UE) during the off periods. The UE may also be configured to perform monostatic sensing during the off periods. Network energy savings may be realized by reducing the transmission and reception requirements on the base station. Other capabilities may be provided and not every implementation according to the disclosure must provide any, let alone all, of the capabilities discussed.

BRIEF DESCRIPTION OF THE DRAWINGS

FIGS. 2A and 2B illustrate example wireless network structures.

FIGS. 3A to 3C are simplified block diagrams of several sample components that may be employed in wireless communication nodes and configured to support communication and radio frequency (RF) sensing.

FIG. 14 is an example process flow diagram of a method for performing RF sensing operations with a wireless node.

FIG. 16 is an example process flow diagram of a method for performing RF sensing operations in a tracking mode.

DETAILED DESCRIPTION

Figure 1:
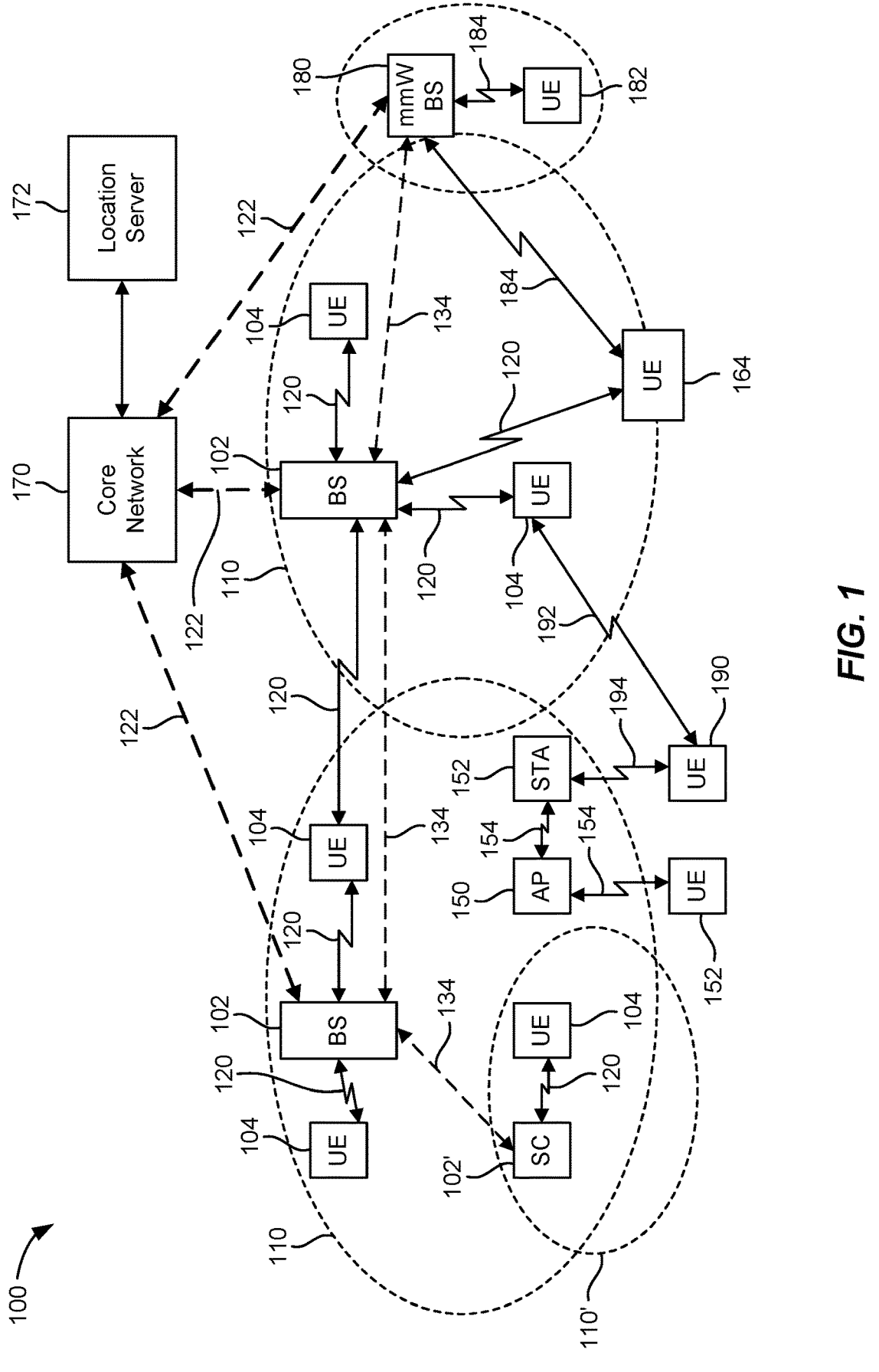
FIG. 1 illustrates an example wireless communications system.

Techniques are provided herein for aligning radio frequency (RF) sensing operations with base station discontinuous reception (DRX) and discontinuous transmission (DTX) cycles. In general, aligning the transmission and reception of a wireless transceiver may improve power savings. A cellular network may realize energy savings if cell DTX is assumed and aligned with cell DRX. Certain modules (e.g., high speed clock, baseband modules) may only be shut off when both transmitter and receiver components are off. The techniques provided herein enable a mobile device, such as a user equipment (UE) to perform RF sensing operations when other base stations (e.g., gNBs) are configured with DRX/DTX cycles. In an example, explicit network signaling or established cycle pattern configuration may be utilized to inform a UE of cell DRX/DTX switching between on and off periods. Based on the DRX/DTX cycles, a UE may adapt particular RF sensing activities such as object detection and tracking modes, monostatic and bistatic sensing, and gNB sensing assistance. Other activities and RF sensing operations may also be adapted based on the network DRX/DTX cycles.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STA 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHZ unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave.

Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over communication links 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
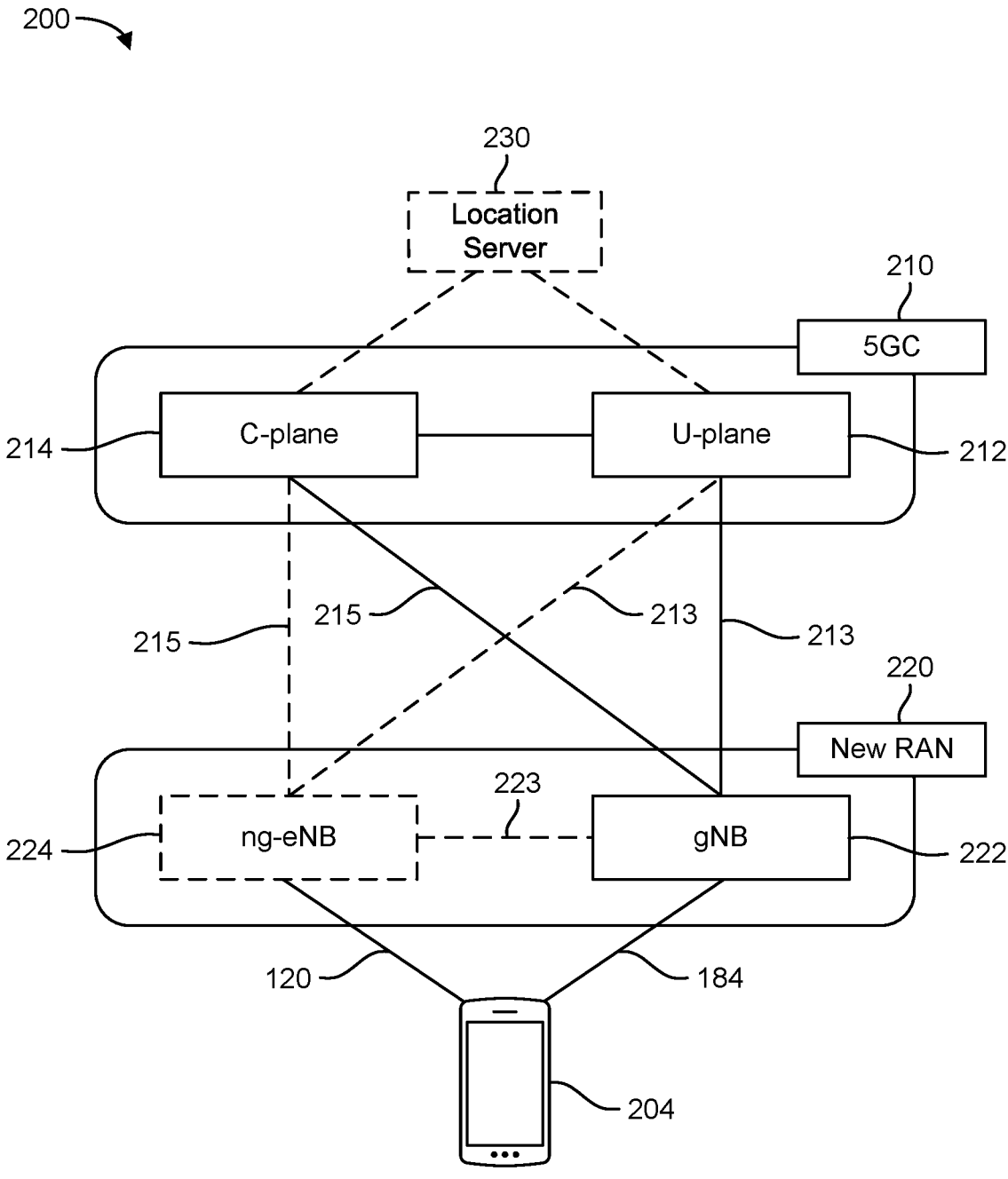

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
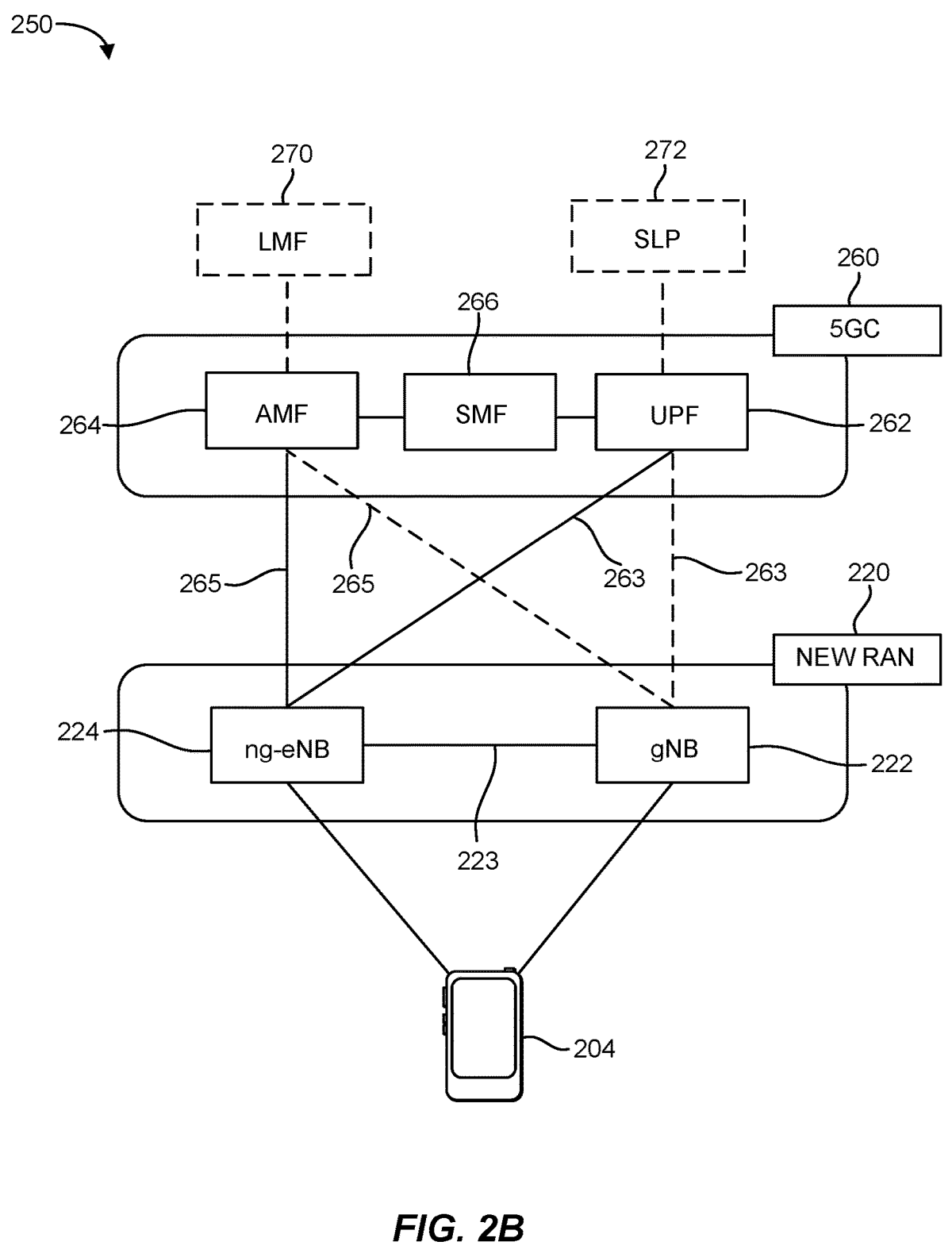

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3B:
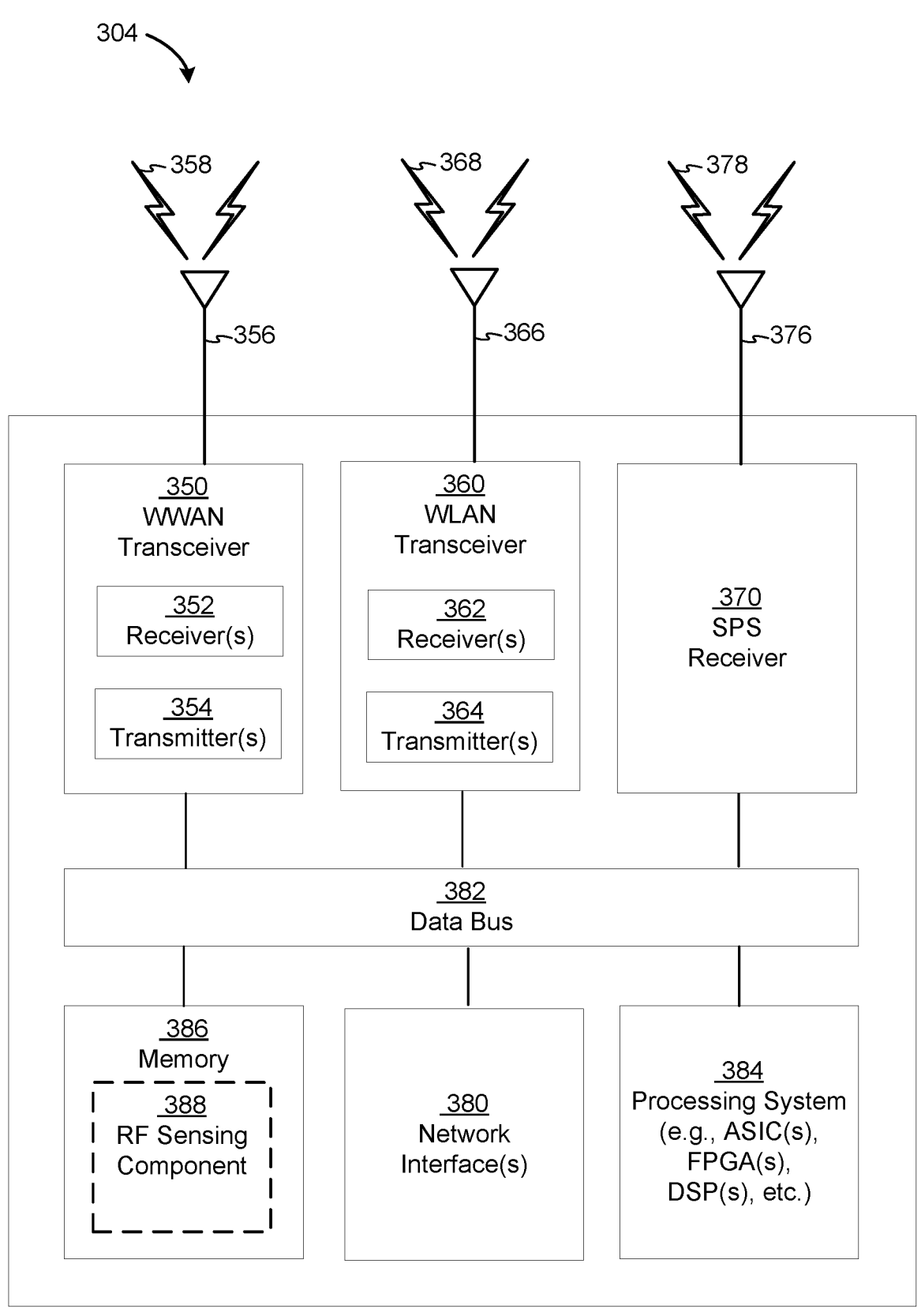

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE

302 includes processor circuitry implementing a processing system 332 for providing functionality relating to, for example, RF sensing (i.e., integrated sensing and communications (ISAC) operations), and for providing other processing functionality. The base station 304 includes a processing system 384 for providing functionality relating to, for example, RF sensing operations as disclosed herein, and for providing other processing functionality. The network entity 306 includes a processing system 394 for providing functionality relating to, for example, RF sensing operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RF sensing components 342, 388, and 398, respectively. The RF sensing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF sensing components 342, 388, and 398 may be external to the processing systems 332, 384, and 394 (e.g., part of a modem processing system, integrated with another processing system, etc.). Alternatively, the RF sensing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS.

3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by components 310 to 346 may be implemented by processor and memory component(s) of the UE 302 (e.g., by execution of appropriate code and/or by appropriate configuration of processor components). Similarly, some or all of the functionality represented by components 350 to 388 may be implemented by processor and memory component(s) of the base station 304 (e.g., by execution of appropriate code and/or by appropriate configuration of processor components). Also, some or all of the functionality represented by components 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RF sensing components 342, 388, and 398, etc.

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
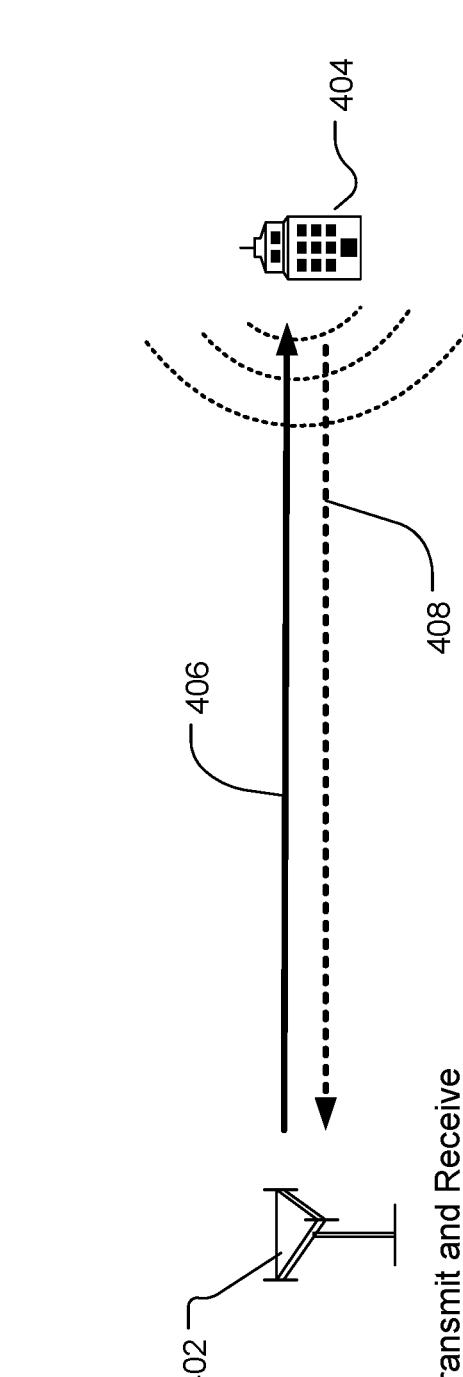
FIG. 4A illustrates an example monostatic RF sensing system.
Figure 4B:
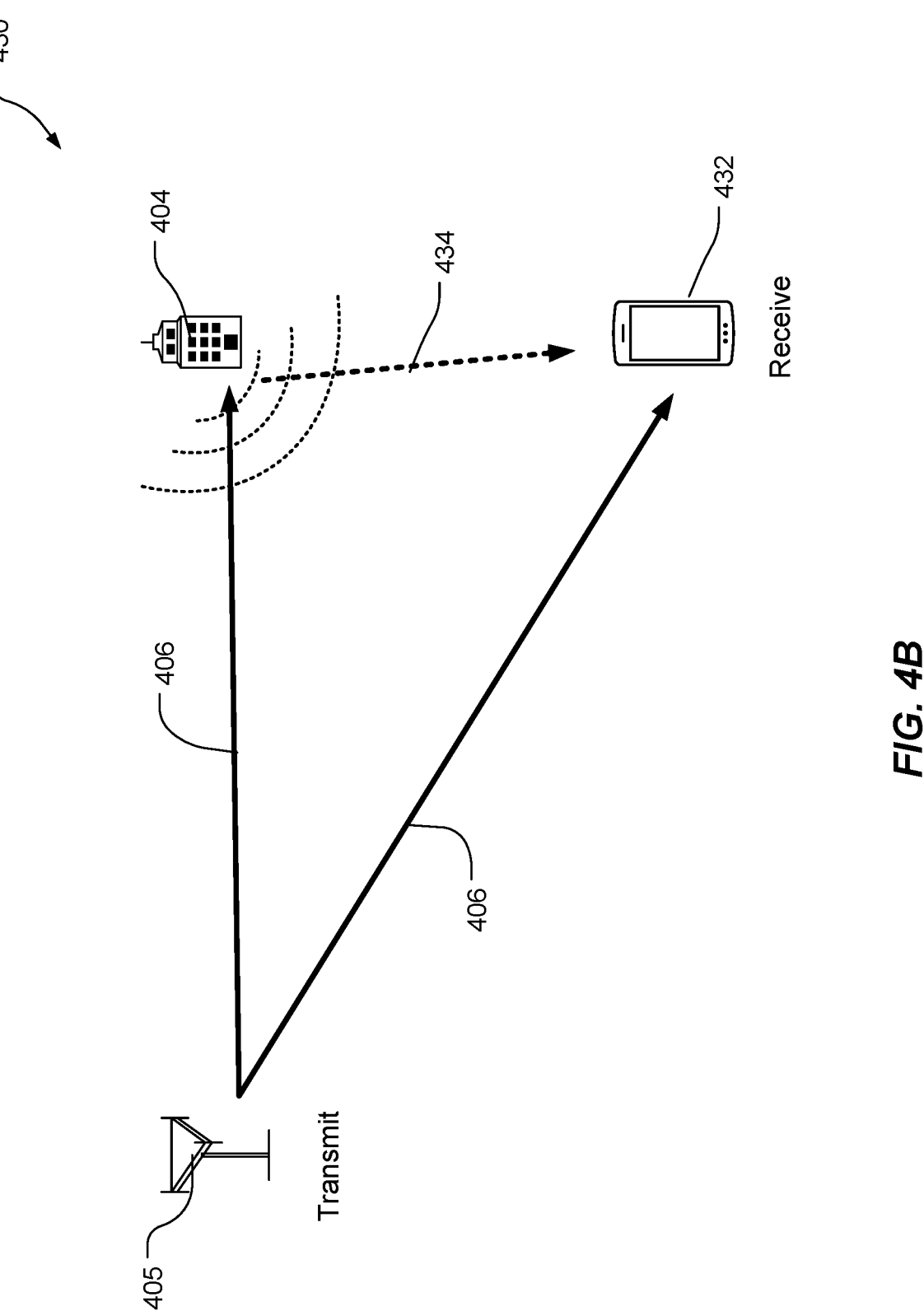
FIG. 4B illustrates an example bistatic RF sensing system.

In general, there are different types of RF sensing operations, and in particular, monostatic and bistatic operations. FIGS. 4A and 4B illustrate two of these various types of RF sensing operations. Specifically, FIG. 4A is a diagram 400 illustrating a monostatic RF sensing scenario, and FIG. 4B is a diagram 430 illustrating a bistatic RF sensing scenario. In FIG. 4A, a base station 402 may be configured for full duplex operation and thus the transmitter (Tx) and receiver (Rx) are co-located. For example, a transmitted radio frequency (RF) signal 406 may be reflected off a target object, such as a building 404, and the receiver on the base station 402 is configured to receive and measure a reflected beam 408. This is a typical use case for traditional, or conventional, radar. In an example, monostatic RF sensing may be realized with half duplex operation such that a transceiver may be configured to transmit a RF sensing signal at a first time, and then receive a reflected signal at a second time. In FIG. 4B, a base station 405 may be configured as a transmitter (Tx) and a UE 432 may be configured as a receiver (Rx). In this example, the transmitter and the receiver are not co-located, that is, they are separated. The base station 405 may be configured to transmit a signal, such as an omnidirectional downlink RF signal or a beamformed RF signal which may be received by the UE 432. A portion of the RF signal 406 may be reflected or refracted by the building 404 and the UE 432 may receive this reflected signal 434. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 405 and the receiver is the UE 432, whereas in an uplink scenario, the transmitter is a UE and the receiver is a base station.

Referring to FIG. 4B in greater detail, the base station 405 transmits RF sensing signals (e.g., PRS) to the UE 432, but some of the RF sensing signals reflect off a target object such as the building 404. The UE 432 can measure the ToAs of the RF signal 406 received directly from the base station, and the ToAs of the reflected signal 434 which is reflected from the target object (e.g., the building 404).

The base station 405 may be configured to transmit the single RF signal 406 or multiple RF signals to a receiver (e.g., the UE 432). However, the UE 432 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 405 and the UE 432, and the reflected signal 434 represents the RF sensing signals that followed a NLOS path between the base station 405 and the UE 432 due to reflecting off the building 404 (or another target object). The base station 405 may have transmitted multiple RF sensing signals (not shown in FIG. 4B), some of which followed the LOS path and others of which followed the NLOS path. Alternatively, the base station 405 may have transmitted a single RF sensing signal in a broad enough beam that a portion of the RF sensing signal followed the LOS path and a portion of the RF sensing signal followed the NLOS path. In an example, the base station 405 may be configured to transmit a beam, such as an omnidirectional downlink RF signal which may be received by the UE 432.

Based on the difference between the ToA of the LOS path, the ToA of the NLOS path, and the speed of light, the UE 432 can determine the distance to the building 404. In addition, if the UE 432 is capable of receive-beam forming, the UE 432 may be able to determine the general direction to the building 404 as the direction of the reflected signal 434, which is the RF sensing signal following the NLOS path as received. The UE 432 may then optionally report this information to the transmitting base station 405, an application server associated with the core network, an external client, a third-party application, or some other entity. Alternatively, the UE 432 may report the ToA measurements to the base station 405, or other entity, and the base station 405 may determine the distance and, optionally, the direction to the target object.

Note that if the RF sensing signals are uplink RF signals transmitted by the UE 432 to the base station 405, the base station 405 would perform object detection based on the uplink RF signals just like the UE 432 does based on the downlink RF signals.

Figure 5:
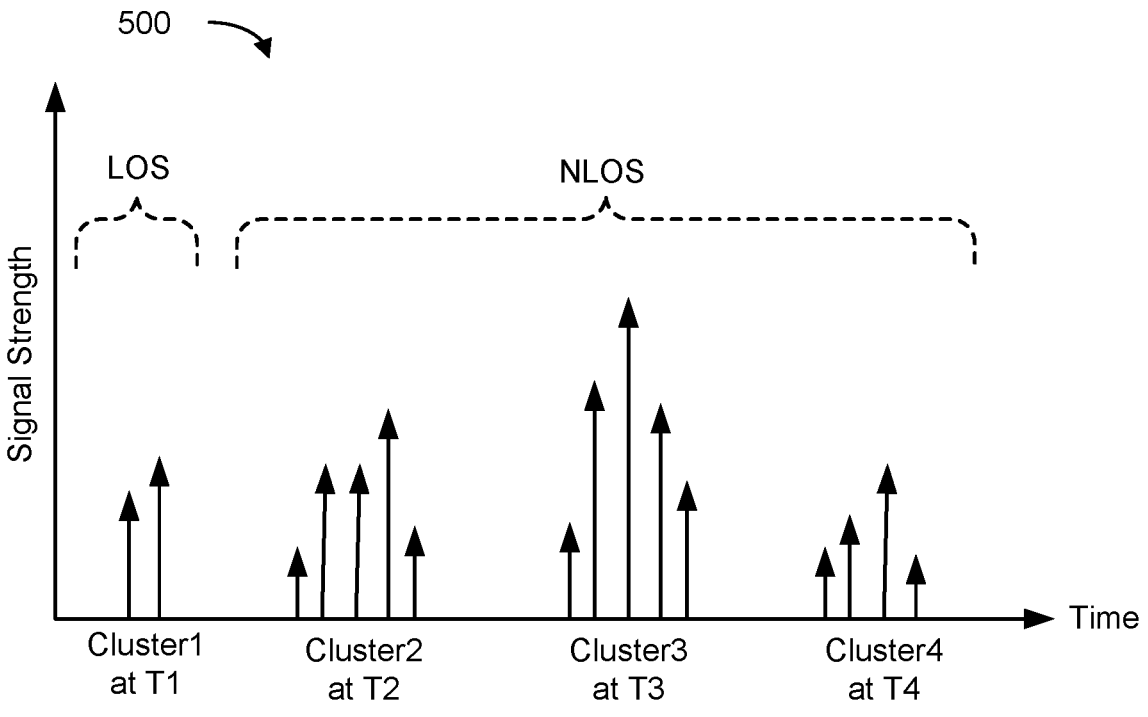
FIG. 5 is an example graph showing a radio frequency channel response over time.

Referring to FIG. 5, an example graph 500 showing an RF channel response at a receiver (e.g., any of the UEs or base stations described herein) over time is shown. In the example of FIG. 5, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is presumed to be the LOS data stream (i.e., the data stream arriving over the LOS or the shortest path), and may correspond to the LOS path illustrated in FIG. 4B (e.g., the RF signal 406, which has LOS to the UE 432 and the building 404). The third cluster at time T3 is comprised of the strongest RF signals, and may correspond to the NLOS path illustrated in FIG. 4B (e.g., the reflected signal 434). Note that although FIG. 5 illustrates clusters of two to five channel taps, as will be appreciated, the clusters may have more or fewer than the illustrated number of channel taps.

Figure 6:
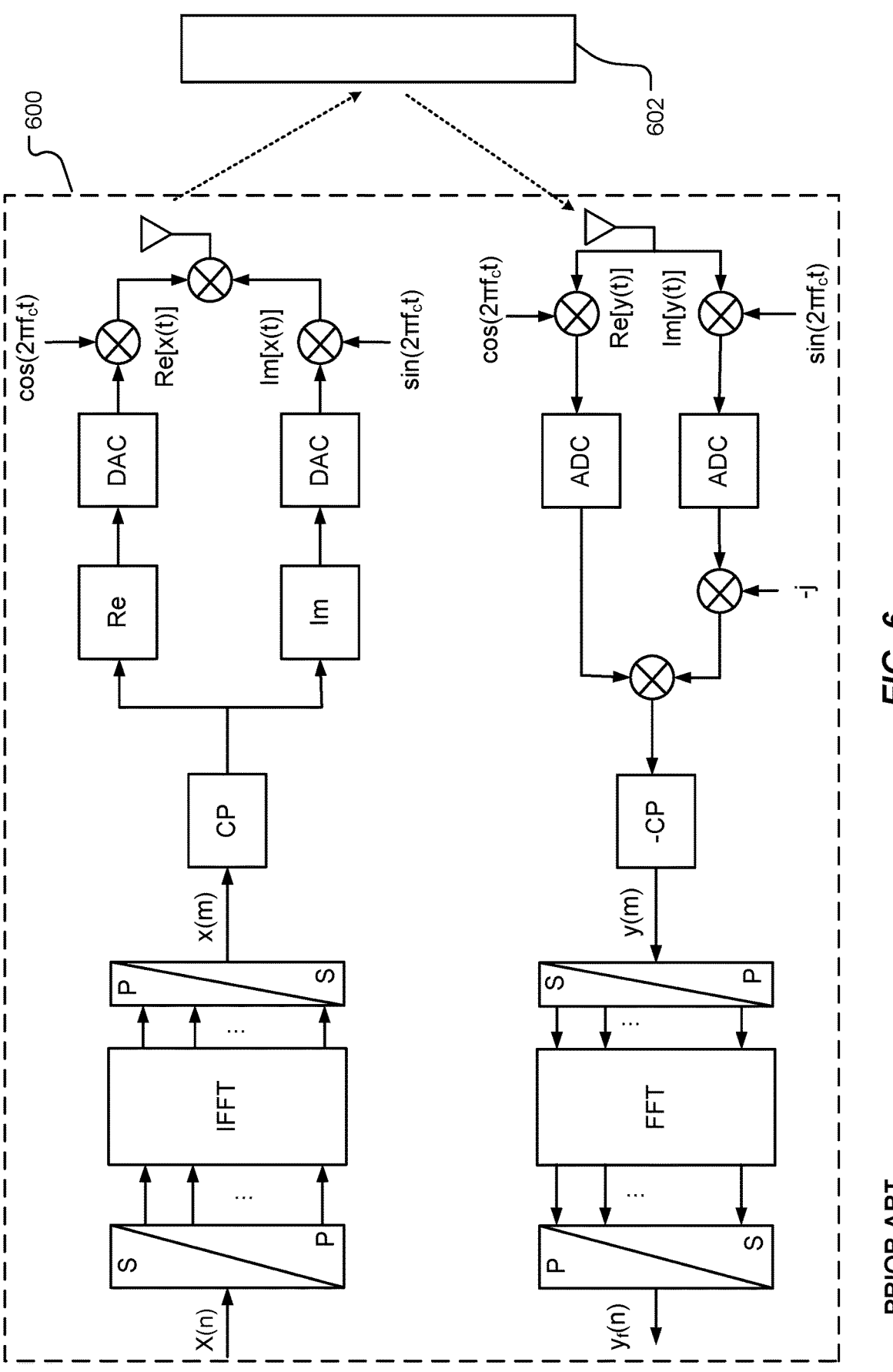
FIG. 6 is a block diagram of a prior art RF transceiver system.

Referring to FIG. 6, a block diagram of a prior art RF transceiver system 600 is shown. The RF transceiver system 600 is an example of an RF sensing capable transmitter and receiver that may be employed by the example wireless communication nodes described herein. The RF transceiver system 600 is configured to transmit RF signals which may be used for communications and RF sensing operations. In an example, OFDM symbols may be generated via Inverse Fast Fourier Transform (IFFT) and shifted into the RF band via quadrature modulation and transmitted over the channel, which may include one or more objects 602. A receiver may receive reflected signals and remove the cyclic prefix (CP) from the quadrature demodulated signal. Complex modulation symbols may be obtained via the FFT. The received waveform may be demodulated based on spectral division, which cancels out the transmitted complex modulation symbols by elementwise multiplication. This 2D-FFT processing enables distance-velocity RF sensing that is similar to frequency modulated continuous wave (FMCW) based radar systems. In an example, the RF transceiver system 600 may be configured to generate FMCW waveforms for performing RF sensing operations.

Figure 7:
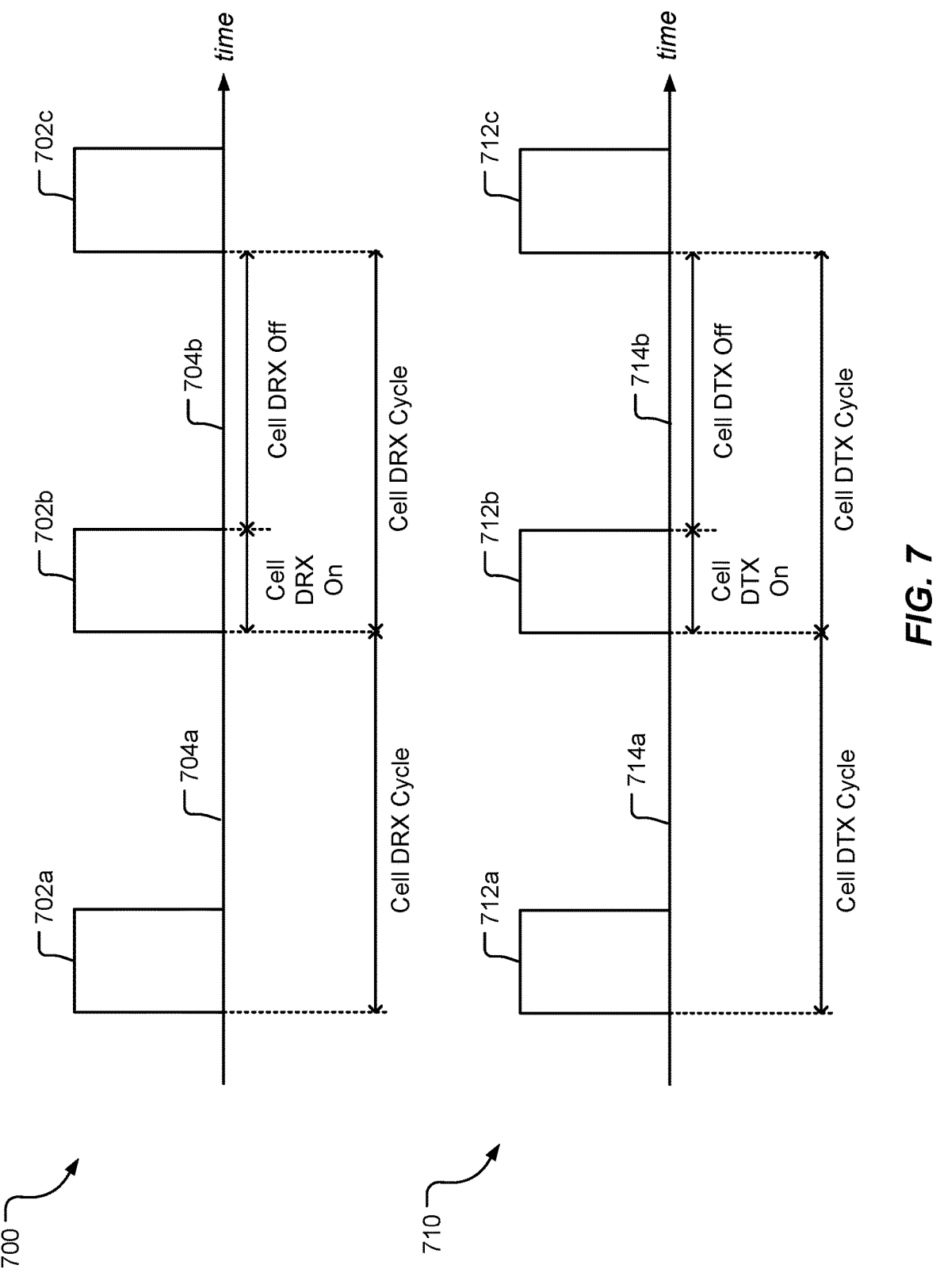
FIG. 7 includes example timing diagrams of discontinuous reception (DRX) and discontinuous transmission (DTX) in a base station.

Referring to FIG. 7, example timing diagrams of discontinuous reception (DRX) and discontinuous transmission (DTX) in a base station are shown. A base station 102, such as a gNB, may be configured to utilize DRX and DTX when cell loads are relatively low (e.g., when the number of active UEs served by a cell is below a threshold value and the UEs do not require latency critical traffic). The DRX cycles may be implemented on a gNB to reduce the power consumed by the gNB by reducing the reception activities. As a result, transmissions by UE's is restricted to the cell DRX on period. Power savings may also be realized with cell DTX operations by reducing a gNB's transmission activities. The UEs in the coverage area may be notified of the cell DTX and/or DRX schedule via broadcast, groupcast, unicast, or other explicit network signaling, and configured to align the UE DRX with the cell DTX to enable power savings on the UE. In an example, the DRX and DTX schedules may be based on a configured pattern.

A first diagram 700 depicts a cell DRX cycle including cell DRX on periods 702*a-c* and cell DRX off periods 704*a-b*. The cell DRX cycle includes a DRX on period (e.g. 702*b*) and a DRX off period (e.g., 704*b*). During the DRX on periods 702*a-c*, a gNB may receive RF signals from UEs, and during the DRX off periods, the gNB deactivates its receiver. A second diagram 710 depicts a cell DTX cycle including cell DTX on periods 712*a-c* and cell DTX off periods 714*a-b*. The cell DTX cycle includes a DTX on period (e.g. 712*b*) and a DTX off period (e.g., 714*b*). During the DTX on periods 712*a-c*, the gNB is configured to transmit to UEs, and during the cell DTX off periods 714*a-b*, the gNB deactivates its transmitter. The proportions of the DRX and DTX cycles in FIG. 7 are examples and not limitations. The durations of on periods 702*a-c*, 712*a-c* may vary based on operational requirements (e.g., cell load, latency performance), and may be in the range of milliseconds to seconds. Other durations may also be used. While the DRX and DTX cycles on a base station may be independent of one another, and may have different on, off and cycle durations, in an example, the DRX and DTX cycles may be aligned. Aligning the DRX and DTX cycles may improve power savings because many transceiver modules such as highspeed clocks and base band modules may only be powered down when both transmit and receive functions are off. As used herein, examples which indicate a DRX cycle may also include a DTX cycle. When a gNB enters a low energy operation state (e.g., DRX and/or DTX), operations by UEs within the cell will be impacted and an operation mode switching may be automatically triggered.

The RF sensing operations may be impacted when cell DTX and/or cell DRX is enabled, and a gNB switches between the on and off periods within the respective cycles. In an example, the cell DRX or DTX cycles may require modification of RF sensing object detection and tracking modes. Object detection mode may utilize short duration sensing signal transmission within a DRX/DTX on period. Tracking mode, however, generally requires relatively longer consecutive sensing signals with phase continuity which may be sensitive to interruption caused by the DRX/DTX cycles. Monostatic and bistatic operations as described in FIGS. 4A and 4B may also be impacted by the cell DRX/ DTX cycles since the gNB (e.g., the base stations 402, 405) may not receive and/or transmit signals during the respective DRX/DTX off periods.

Figure 8:
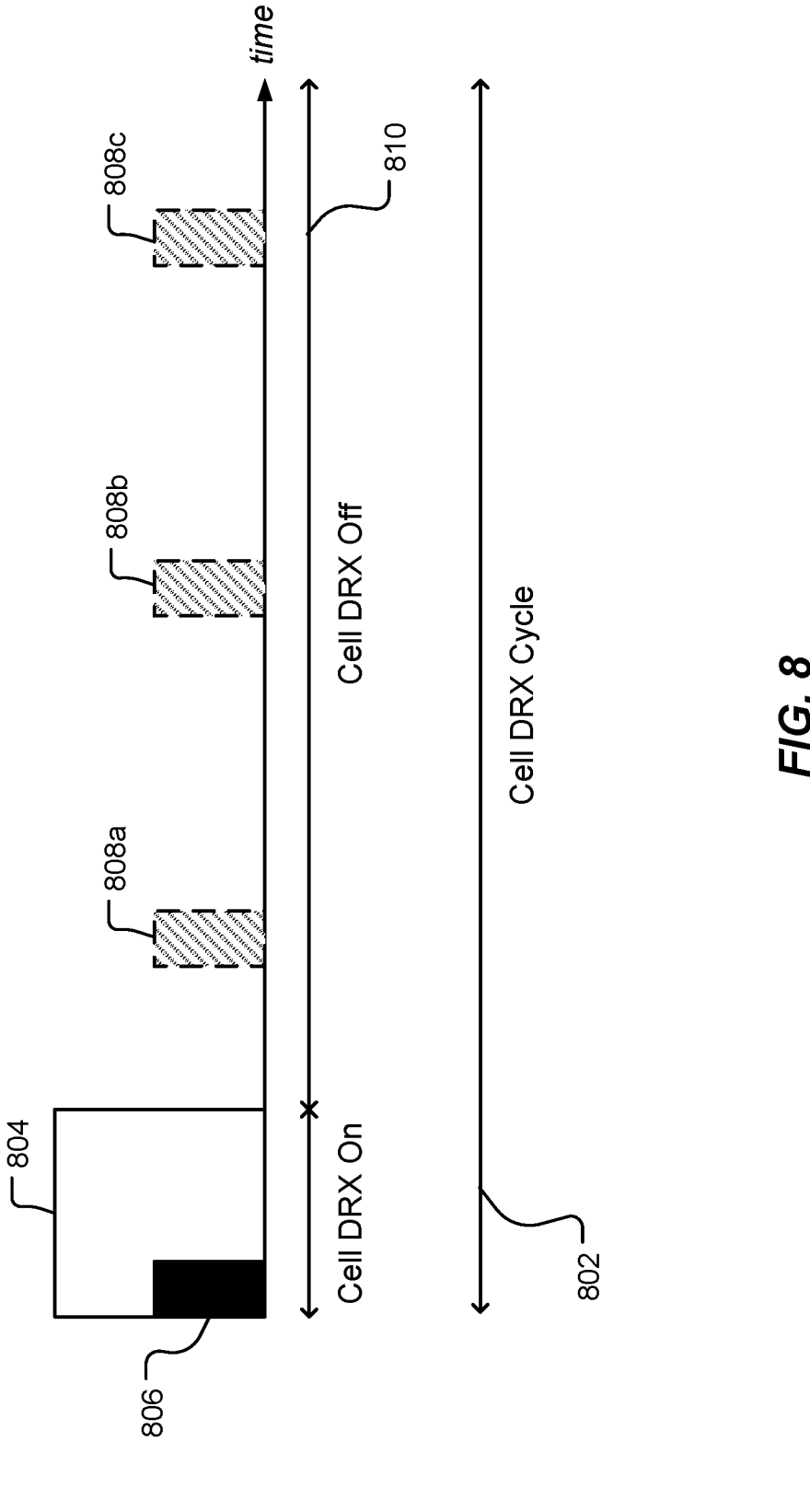
FIG. 8 is an example timing diagram of RF sensing with DRX or DTX on and off periods.

Referring to FIG. 8, an example timing diagram 800 of RF sensing with DRX or DTX off periods is shown. The diagram 800 depicts a cell DRX cycle 802 including a cell DRX on period 804 and a cell DRX off period 810. A UE (or other network wireless device configured for RF sensing operations) may be configured to perform RF sensing operations (e.g., bistatic sensing between the UE and the base station, or monostatic sensing by the base station) in one or more configured RF sensing periods 806, 808*a-c*. In an example, the UE may be configured to receive RF sensing schedule information and cell DRX information via network signaling such as RRC, DCI, or other over-the-air signaling techniques, and determine which RF sensing periods may be used in view of the DRX information. For example, a first RF sensing period 806 may be performed because it is within the cell DRX on period 804, but subsequent schedule RF sensing periods 808*a-c* are skipped because they are within the cell DRX off period 810. In an example, implicit triggers from the gNB to the UE may be configured to instruct the UE to perform RF sensing operations during the DRX on period 804 (e.g., a MAC Control Element (CE) may be configured as a trigger). While the timing diagram 800 indicates a cell DRX cycle 802, the same signaling and RF sensing operations alignment may be performed with a cell DTX cycle. For example, the first RF sensing period may be within a cell DTX on period.

Figure 9:
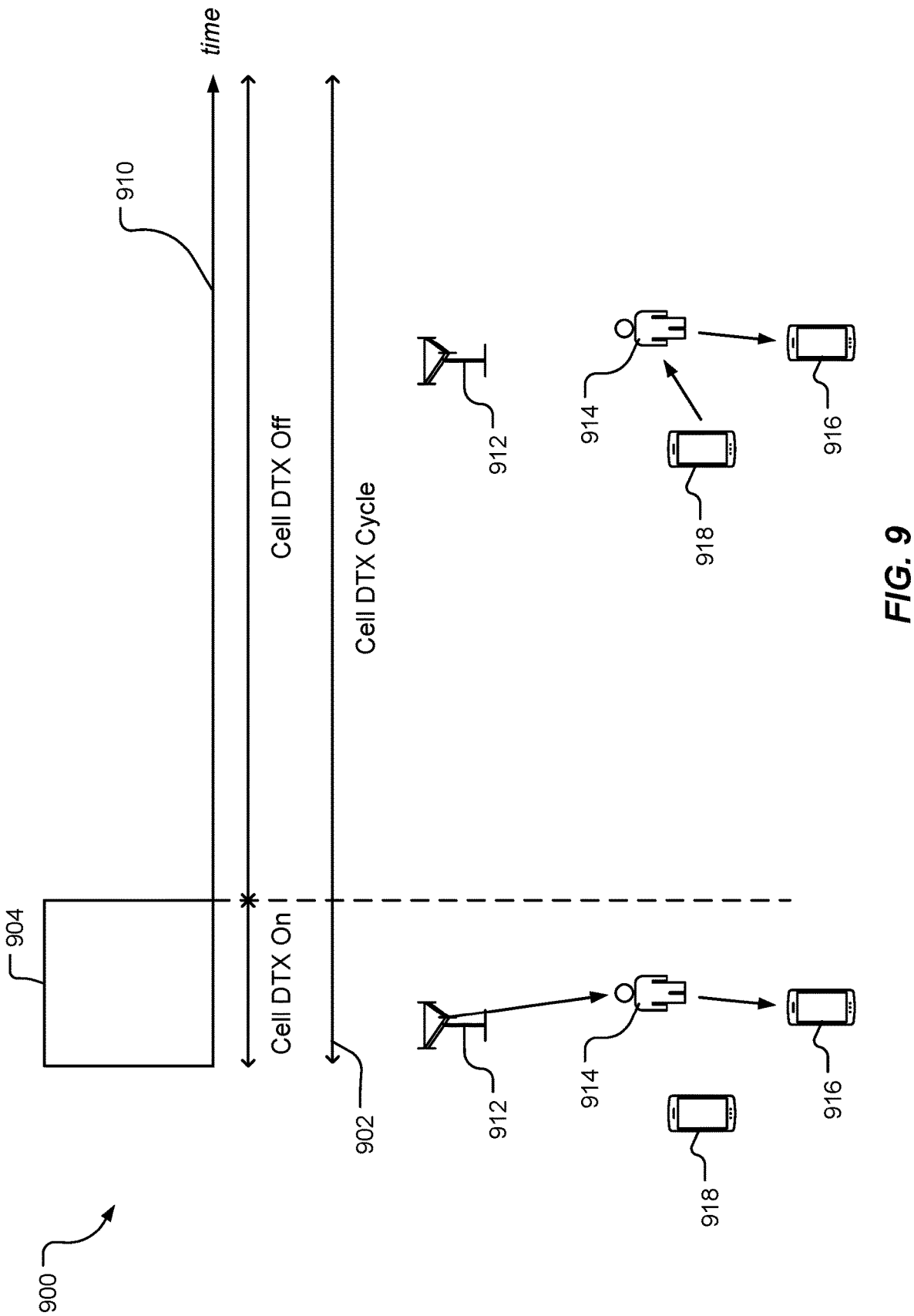
FIG. 9 is a timing diagram and illustrations of example bistatic RF sensing operations in a DRX or DTX cycle.

Referring to FIG. 9, a timing diagram 900 and illustrations of example bistatic RF sensing operations in a DRX or DTX cycle are shown. The timing diagram 900 includes a cell DTX cycle 902 with a cell DTX on period 904 and a cell DTX off period 910. In operation, a base station 912 (e.g., gNB) is configured to perform bistatic sensing with a first UE 916. For example, the RF sensing operations may be used to detect or track an object 914, such as a person, a vehicle, or other objects. During the cell DTX on period 904, the base station 912 may transmit RF sensing signals which are received by the first UE 916. The base station 912 will stop transmitting RF sensing signal during the cell DTX off period 910. The first UE 916 may be configured to stop receiving (or transmitting) RF sensing signals with the base station 912 during the cell DTX (or DRX) off period 910. The first UE 916 may be configured to modify a RF sensing signaling periodicity to match the DTX (or DRX) periodicity. In an example, the first UE 916 may increase the sensing periodicity so that the sensing occasions always fall in the cell DTX (or DRX) on periods. The UE 916 may be configured to switch from the current sensing signal configuration to another sensing signal configuration which has a sensing signal periodicity. In an example, the first UE 916 may be configured to continue RF sensing with neighboring wireless nodes during the cell DTX off period 910. A second UE 918 may be configured to transmit RF sensing signals which are detected by the first UE 916 to detect or track the object 914. In an example, the bistatic RF sensing during the cell DTX on period 904 may be based on OFDM waveforms, and the first UE 916 and second UE 918 may be configured to switch to an FMCW waveform, or other waveform, for bistatic RF sensing during the cell DTX off period 910. The FMCW, or other waveforms, may be configured to be implemented with lower cost components (e.g., less capable) as compared to the hardware and software required to process OFDM signals.

Figure 10:
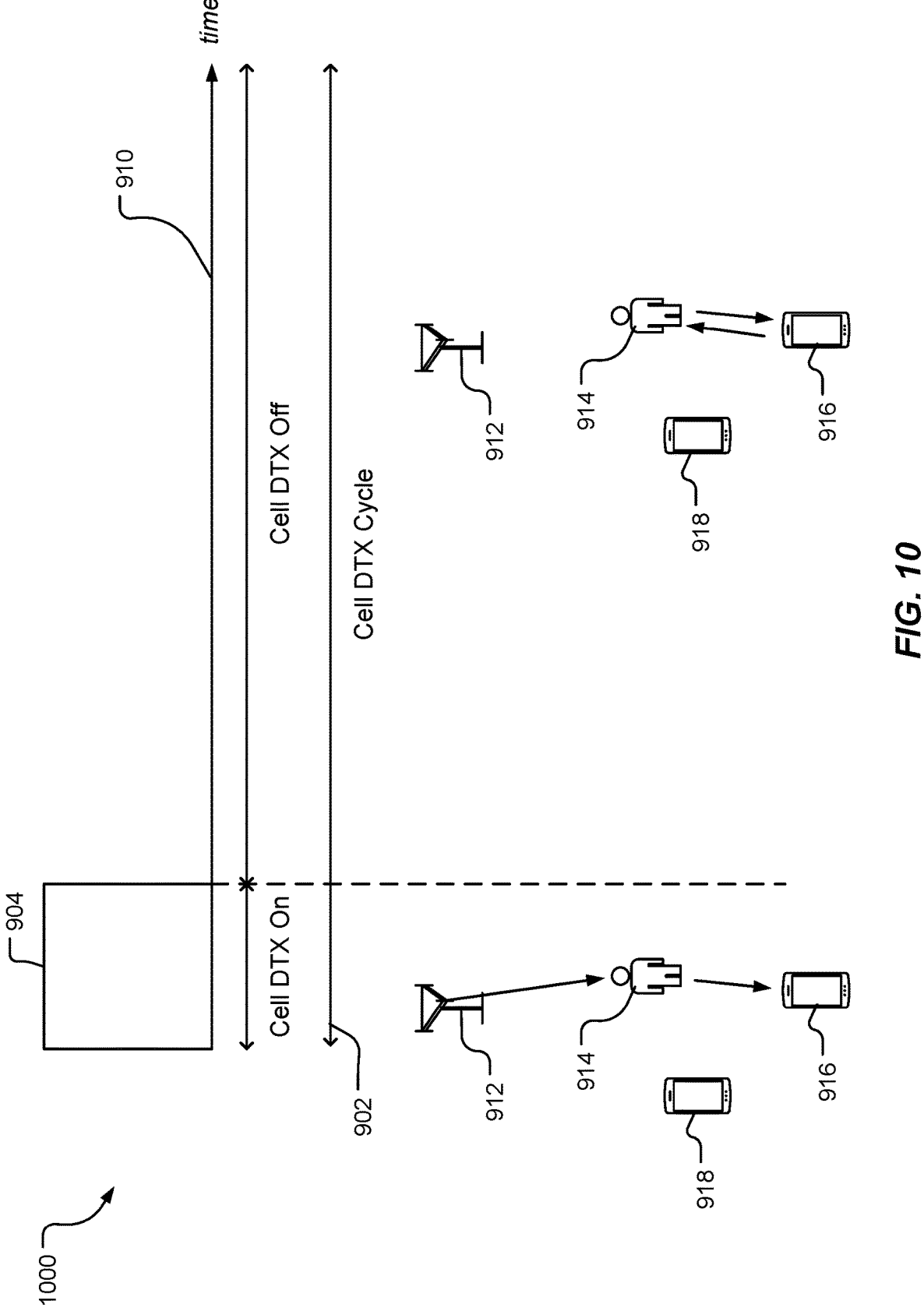
FIG. 10 is a timing diagram and illustrations of example bistatic and monostatic RF sensing operations in a DRX or DTX cycle.

Referring to FIG. 10, a timing diagram 1000 and illustrations of example bistatic and monostatic RF sensing operations in a DRX or DTX cycle are shown. The timing diagram 1000 includes the cell DTX cycle 902 with the cell DTX on period 904 and the cell DTX off period 910. In operation, a base station 912 (e.g., gNB) is configured to perform bistatic sensing with a first UE 916 as described in FIG. 9. When the base station 912 stops transmitting RF sensing signal during the cell DTX off period 910, the first UE 916 may be configured to perform monostatic RF sensing. The RF sensing signals may be figured in overlapping resources with those from RF sensing signals for bistatic sensing with the base station 912. In an example, the bistatic RF sensing during the cell DTX on period 904 may be based on OFDM waveforms, and the first UE 916 may be configured to switch to an FMCW waveform, or other waveform, for monostatic RF sensing during the cell DTX off period 910.

Figure 11:
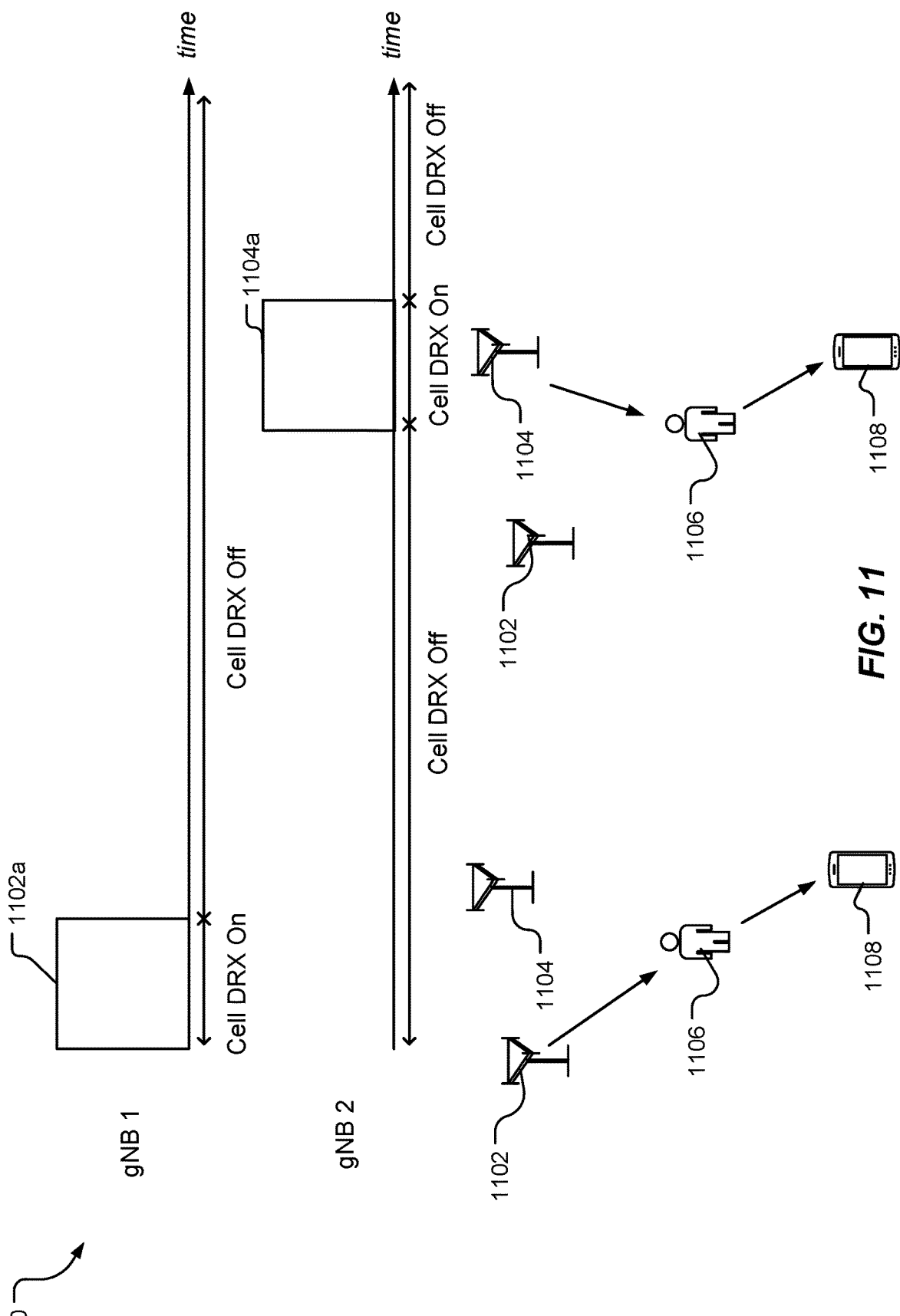
FIG. 11 includes timing diagrams and illustrations of example bistatic RF sensing operations with multiple base stations with different DRX or DTX cycles.

Referring to FIG. 11, timing diagrams 1100 and illustrations of example bistatic RF sensing operations with multiple base stations with different DRX or DTX cycles are shown. The timing diagrams 1100 include cell DTX cycles for a first base station 1102 (gNB1) and a second base station 1104 (gNB2). The first base station 1102 is configured to utilize a first cell DTX on period 1102*a*, and the second base station 1104 is configured to utilize a second cell DTX on period 1104*a*. The first base station 1102 may be configured to perform bistatic RF sensing with a UE 1108 to detect or track an object 1106. When the first base station 1102 enters a cell DTX off period, the UE 1108 may be configured to switch to another gNB which is in the on period. For example, the UE 1108 may perform bistatic RF sensing operations with the second base station 1104 during the second cell DTX on period 1104*a*. The switching may be performed in a preconfigured order of base stations based on one or more established factors, such as distances from the object 1106, capabilities of the base stations or the UE, the location of the UE 1108, or combinations of factors. For example, if multiple other base stations are in their on periods, the UE may switch to the one with shortest distance.

Figure 12:
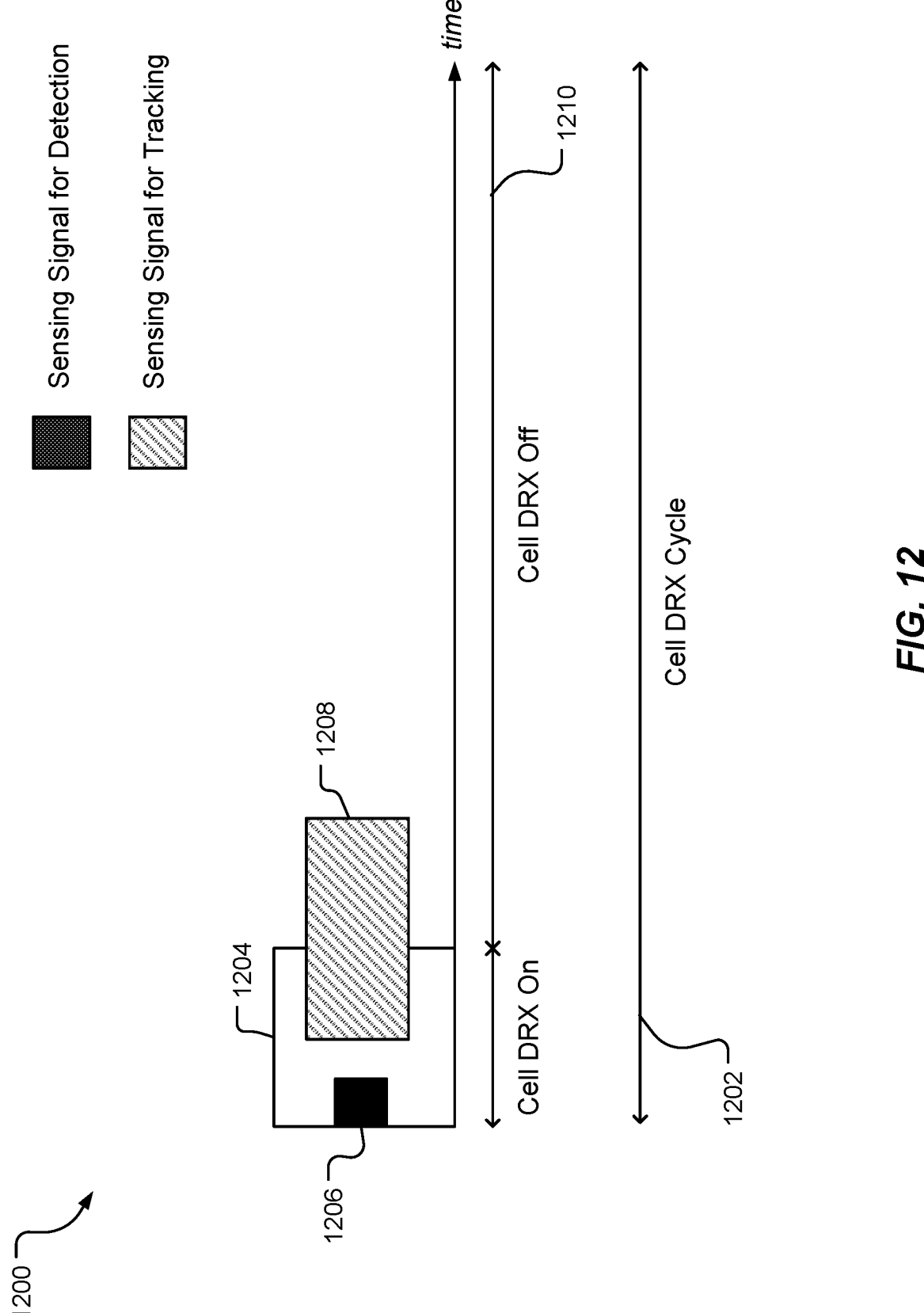
FIG. 12 is a timing diagram of example RF sensing operations for detection and tracking.

Referring to FIG. 12, a timing diagram 1200 of example RF sensing operations for detection and tracking are shown. The diagram 1200 includes a cell DRX cycle 1202 with a cell DRX on period 1204 and a cell DRX off period 1210. RF sensing operations in a detection mode may require relatively short bursts of an RF waveform to initially detect the presence of an object. For example, a detection mode RF signal 1206 may have a duration that is within (e.g., less than) the cell DRX on period 1204. Tracking mode operations may require more complex waveforms (e.g., larger bandwidth) as compared to detection mode, and may require long consecutive sensing signals with phase continuity. The longer duration RF sensing signal transmissions in tracking mode may enable improved target resolution and target speed estimations. In an example, a tracking mode RF signal 1208 may have a duration that exceeds the cell DRX on period 1204. In operation, a UE may be configured to stop bistatic RF sensing with a gNB in a tracking mode when the gNB enables DRX or DTX. The UE may be configured to stop tracking mode if the cell DRX (or DTX) on period 1204 is less than a threshold value (e.g., the duration of the tracking mode RF signal 1208) and/or the cell DRX (or DTX) cycle 1202 is larger than a threshold value because the UE may not have enough RF sensing signaling with phase continuity in the same on period, or the UE will need to wait an extended period for the next tracking sensing signal opportunity. The UE may be configured to switch to detection mode and may utilize the bistatic and monostatic techniques described in FIGS. 9-11.

Figure 13:
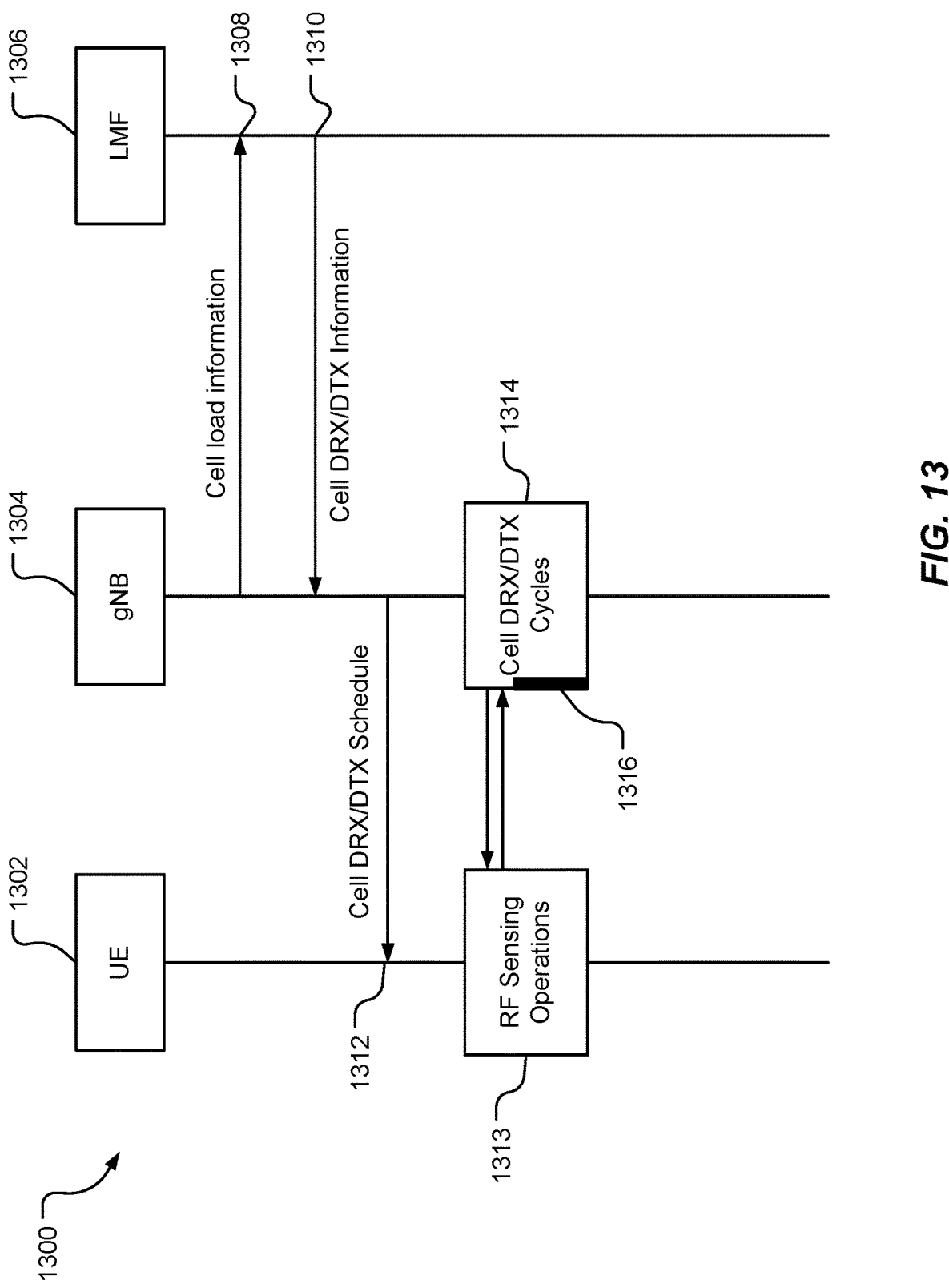
FIG. 13 is an example message flow diagram for configuring RF sensing operations based on base station DRX or DTX cycles.

Referring to FIG. 13, an example message flow 1300 diagram for configuring RF sensing operations based on base station DRX or DTX cycles is shown. The message flow 1300 includes a UE 1302, a gNB 1304 and a network server, such as an LMF 1306. Additional mobile devices, base stations, and network resources may also be included in the message flow 1300. In an example, the LMF 1306 may communicate with the gNB 1304 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 1304 and the LMF 1306. The LMF 1306 and the UE 1302 may communicate using an LTE Positioning Protocol (LPP), which may be defined in 3GPP TS 36.355. The LMF 1306 and the UE 1302 may also or instead communicate using a New Radio Positioning Protocol (which may be referred to as NPP or NRPP), which may be the same as, similar to, or an extension of LPP. The message flow 1300 may utilize other signaling techniques (e.g., RRC, DCI) to configure RF sensing operations. A gNB 1304 may be configured to provide one or more cell load information messages 1308 to a network server, such as the LMF 1306, to request power saving configurations from the network. In an example, the LMF 1306 may be configured to determine cell DRX and DTX configuration information to enable power savings. The LMF 1306 (or other network resource) may send one or more cell DRX/DTX information messages 1310 to the gNB 1304 to configure the DRX/DTX cycles on the gNB 1304. The LMF 1306 may provide the cell DRX/DTX information message 1310 to neighboring base stations and to other wireless nodes (e.g., UEs, Access Points, etc.) in the network. In an example, the gNB 1304 may be configured to provide cell DRX/DTX schedule messages 1312 to the UE 1302. The cell DRX/DTX schedule messages 1312 may be unicast, groupcast, broadcast to the UE 1302 and other stations in the coverage area. In an example, RRC messaging may be used to provide the cell DRX/DTX schedule messages 1312. For example, one or more system information blocks (SIBs) may include the DRX/DTX cycle information. At stage 1313, the UE 1302 may be configured to perform RF sensing operations during a cell DRX/DTX cycle 1314 on the gNB 1304. The UE 1302 may be configured to transmit and/or receive RF sensing signals to/from the gNB 1304 during the DRX/DTX on period in the cell DRX/DTX cycle 1314. The UE 1302 may stop sending and receiving RF sensing signals with the gNB 1304 during the DRX/DTX off period 1316. The UE 1302 may utilize monostatic RF sensing, or utilize other stations for bistatic RF sensing as described herein during the DRX/DTX off period 1316, Referring to FIG. 14, with further reference to FIGS. 1-13, a method 1400 for performing RF sensing operations with a wireless node includes the stages shown. A UE 302 or other wireless nodes described herein, may be configured to perform RF sensing operations. The method 1400 is, however, an example and not limiting. The method 1400 may be altered, e.g., by having stages added, removed, rearranged, combined, performed concurrently, and/or having single stages split into multiple stages.

At stage 1402, the method includes receiving discontinuous reception (DRX) or discontinuous transmission (DTX) information for a wireless node. A UE 302 including the transceiver 310 and the processing system 332, is a means for receiving the DRX/DTX information. In an example, the DRX/DTX information may be transmitted from a base station 304, such as the gNB 1304. The DRX/DTX information may be included in one or more cell DRX/DTX schedule messages 1312. Other signaling techniques may also be used to receive the DRX/DTX information. The DTX/DTX information includes cell DRX/DTX cycle configurations as described in FIGS. 7-12 for one or more wireless nodes.

At stage 1404, the method includes determining one or more on periods and one or more off periods based on the discontinuous reception or the discontinuous transmission information. The UE 302 including the processing system 332 is a means for determining the on and off periods. The on periods may be the cell DRX on periods 702a-c and the cell DTX on periods 712a-c, and the off periods may be the cell DRX off periods 704a-b and the cell DTX off periods 714a-b. In an example, the DRX and DTX on and off periods may be aligned (e.g., the same periods). The UE 302 may be configured to compare the DRX/DTX information with RF sensing scheduling information to determine when the wireless node (e.g., the gNB 1304) will be available for RF sensing operations as described in FIGS. 8-12.

At stage 1406, the method includes performing radio frequency sensing operations with the wireless node during the one or more on periods. The UE 302 including the RF sensing component 342 is a means for performing the RF sensing operations. The RF sensing operations may be bistatic RF sensing using uplink and/or downlink channels. The wireless node (e.g., gNB) may be configured to transmit RF sensing signals and/or receive RF sensing signals transmitted by a mobile device. For example, the wireless node may be the base station 912 and the mobile device may be the first UE 916.

At stage 1408, the method includes ceasing radio frequency sensing operations with the wireless node during the one or more off periods. The UE 302 including the processing system 332 is a means for ceasing the RF sensing operations with the wireless node. In an example, the UE 302 may be configured to perform bistatic RF sensing with a neighboring wireless node such as the second UE 918 or a neighboring base station, such as the second base station 1104. In an example, the UE 302 may be configured to perform monostatic RF sensing operations during the one or more off periods.

Figure 15:
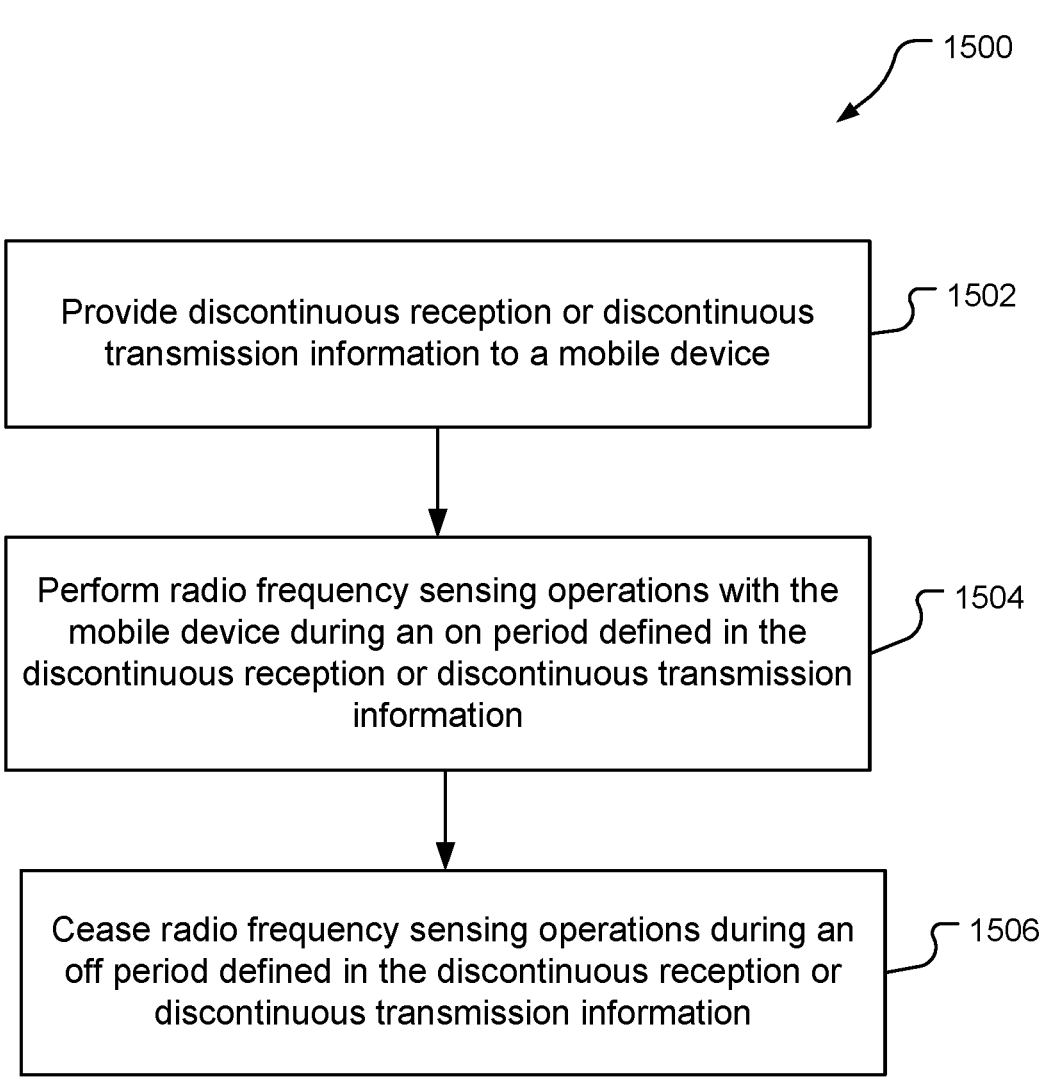
FIG. 15 is an example process flow diagram of a method for performing RF sensing operations with a mobile device.

Referring to FIG. 15, with further reference to FIGS. 1-13, a method 1500 for performing RF sensing operations with a mobile device includes the stages shown. A UE 302 or other wireless nodes described herein, may be configured to perform RF sensing operations. The method 1500 is, however, an example and not limiting. The method 1500 may be altered, e.g., by having stages added, removed, rearranged, combined, performed concurrently, and/or having single stages split into multiple stages.

At stage 1502, the method includes providing discontinuous reception or discontinuous transmission information to a mobile device. A base station 304, including the transceiver 350 and the processing system 384 is a means for providing the DRX/DTX information. In an example, the DRX/DTX information may be transmitted from the base station 304, such as the gNB 1304 to a mobile device, such as the UE 1302. The DRX/DTX information may be included in one or more cell DRX/DTX schedule messages 1312. Other signaling techniques may also be used to provide the DRX/DTX information. The DTX/DTX information may include cell DRX/DTX cycle configurations as described in FIGS. 7-12 for one or more wireless nodes.

At stage 1504, the method includes performing radio frequency sensing operations with the mobile device during an on period defined in the discontinuous reception or discontinuous transmission information. The base station 304 including the RF sensing component 388 and the processing system 384 is a means for performing the RF sensing operations. The RF sensing operations may be bistatic RF sensing using uplink and/or downlink channels. The base station (e.g., gNB) may be configured to transmit RF sensing signals and/or receive RF sensing signals transmitted by the mobile device. For example, the base station 912 may be configured to perform the RF sensing operations with the first UE 916.

At stage 1506, the method includes ceasing radio frequency sensing operations during an off period defined in the discontinuous reception or discontinuous transmission information. The base station 304 including the processing system 384 is a means for ceasing RF sensing operations. In an example, the base station 304 may be configured to turn off transmitter and/or receiver components during the cell DRX/DTX off periods 704*a-b*, 714*a-b*. RF sensing, and other signaling, will cease when the components are shut down or placed into a low-power state.

Referring to FIG. 16, with further reference to FIGS. 1-13, a method 1600 for performing RF sensing operations in a tracking mode includes the stages shown. A UE 302 or other wireless nodes described herein, may be configured to perform RF sensing operations in tracking mode. The method 1600 is, however, an example and not limiting. The method 1600 may be altered, e.g., by having stages added, removed, rearranged, combined, performed concurrently, and/or having single stages split into multiple stages.

At stage 1602, the method includes receiving discontinuous reception (DRX) or discontinuous transmission (DTX) information for a wireless node. A UE 302 including the transceiver 310 and the processing system 332, is a means for receiving the DRX/DTX information. In an example, the DRX/DTX information may be transmitted from a base station 304, such as the gNB 1304. The DRX/DTX information may be included in one or more cell DRX/DTX schedule messages 1312. Other signaling techniques may also be used to receive the DRX/DTX information. The DTX/DTX information includes cell DRX/DTX cycle configurations as described in FIGS. 7-12 for one or more wireless nodes.

At stage 1604, the method includes determining one or more on periods and one or more off periods based on the discontinuous reception or the discontinuous transmission information. The UE 302 including the processing system 332 is a means for determining the on and off periods. The on periods may be the cell DRX on periods 702*a-c* and the cell DTX on periods 712*a-c*, and the off periods may be the cell DRX off periods 704*a-b* and the cell DTX off periods 714*a-b*. In an example, the DRX and DTX on and off periods may be aligned (e.g., the same periods). The UE 302 may be configured to compare the DRX/DTX information with RF sensing scheduling information to determine when the wireless node (e.g., the gNB 1304) will be available for RF sensing operations as described in FIGS. 8-12.

At stage 1606, the method includes determining a duration of a radio frequency sensing tracking signal and a period of the radio frequency sensing tracking signal. The UE 302 including the processing system 332 is a means for determining the duration and period of the RF sensing tracking signal. In an example, referring to FIG. 12, the UE 302 may be configured to transmit the tracking mode RF signal 1208 on a periodic basis. The length of the period of this RF sensing tracking signal may be based on pre-configured settings stored in the UE 302 and/or received from the network. The tracking mode RF signal 1208 may have an established duration time. In general, tracking mode operations may require more complex waveforms (e.g., larger bandwidth) as compared to detection mode, and may require long consecutive sensing signals with phase continuity. The longer duration RF sensing signal transmissions in tracking mode may enable improved target resolution and target speed estimations.

At stage 1608, the method includes determining a rate of interruption based at least in part on the period of the radio frequency sensing tracking signal and the one or more on periods and one or more off periods based on the discontinuous reception or the discontinuous transmission information. The UE 302 including the processing system 332 is a means for determining the rate of interruption. The rate of interruption may be based on the frequency in which the cell DRX/DTX off periods interrupt the RF signal occasions in which the UE 304 is in tracking mode. The rate of interruption may be based on a percentage of the actual or scheduled RF sending tracking signal transmissions which occur during the DRX/DTX off periods. In an example, the UE 302 may be configured to compare the period of the RF sensing tracking signal with the DRX/DTX schedule and determine the rate of interruption. Other techniques may also be used to determine when tracking mode operations will be interrupted base on the DRX/DTX schedule.

At stage 1610, the method includes ceasing radio frequency sensing in a tracking mode in response to the rate of interruption exceeding a first threshold value or the duration of the radio frequency sensing tracking signal exceeding a second threshold. The UE 302 including the processing system 332 is a means for ceasing radio frequency operations. In an example, referring to FIG. 12, the tracking mode RF signal 1208 may have a duration that exceeds the cell DRX on period 1204. The UE 302 may be configured to stop bistatic RF sensing with a gNB in a tracking mode when the gNB enables DRX or DTX. The UE may be configured to stop tracking mode if the cell DRX (or DTX) on period 1204 is less than a threshold value (e.g., the duration of the tracking mode RF signal 1208) and/or the cell DRX (or DTX) cycle 1202 is larger than a threshold value because the UE may not have enough RF sensing signaling with phase continuity in the same on period, or the UE will need to wait an extended period for the next tracking sensing signal opportunity. In an example, the first threshold may be based on a time period between receiving radio frequency sensing tracking signals transmitted during the one or more on periods in the discontinuous transmission information. The UE 304 may also stop RF sensing operations in tracking mode if the rate of interruption exceeds a threshold value. For example, the threshold value may be based on a percentage (e.g., 10%, 20%, 50%, etc.) of scheduled or attempted RF sensing tracking signal occasions. In an example, the threshold may be based on a time interval between successful RF sensing tracking signal occasions (i.e., that are transmitted during the DRX/DTX on period). Example threshold values may be 10 ms, 20 ms, 100 ms, 500 ms, etc. The threshold values may be dynamically determined based on features of an object being tracked (e.g., size, speed, direction, signal strength, etc.). Other factors may be used to determine the threshold value.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Implementation examples are described in the following numbered clauses:

Clause 1. A method for performing radio frequency sensing operations with a wireless node, comprising: receiving discontinuous reception or discontinuous transmission information for the wireless node; determining one or more on periods and one or more off periods based on the discontinuous reception or the discontinuous transmission information; performing radio frequency sensing operations with the wireless node during the one or more on periods; and ceasing radio frequency sensing operations with the wireless node during the one or more off periods.

Clause 2. The method of clause 1 wherein the discontinuous reception or the discontinuous transmission information for the wireless node is received from a network server.

Clause 3. The method of clause 1 wherein the discontinuous reception or the discontinuous transmission information for the wireless node is received from the wireless node.

Clause 4. The method of clause 1 wherein the discontinuous reception or the discontinuous transmission information for the wireless node is included in one or more system information blocks (SIBs).

Clause 5. The method of clause 1 further comprising performing bistatic radio frequency sensing operations with a user equipment during the one or more off periods.

Clause 6. The method of clause 5 further comprising: utilizing a first radio frequency sensing waveform for the performing radio frequency sensing operations with the wireless node; and utilizing a second radio frequency sensing waveform for the performing radio frequency sensing operations with the user equipment.

Clause 7. The method of clause 1 further comprising performing monostatic radio frequency sensing operations during the one or more off periods.

Clause 8. The method of clause 1 further comprising performing bistatic radio frequency sensing operations with a base station during the one or more off periods.

Clause 9. The method of clause 1 wherein the performing radio frequency sensing operations with the wireless node during the one or more on periods includes performing radio frequency sensing in an object detection mode.

Clause 10. The method of clause 9 further comprising: comparing the one or more on periods to a threshold duration period; and ceasing the radio frequency sensing operations in an object tracking mode during the one or more on periods in response to the one or more on periods being less than the threshold duration period.

Clause 11. A method for performing radio frequency sensing operations with a mobile device, comprising: providing discontinuous reception or discontinuous transmission information to the mobile device; performing radio frequency sensing operations with the mobile device during an on period included in the discontinuous reception or discontinuous transmission information; and ceasing radio frequency sensing operations during an off period included in the discontinuous reception or discontinuous transmission information.

Clause 12. The method of clause 11 wherein the providing the discontinuous reception or discontinuous transmission information to the mobile device includes broadcasting the discontinuous reception or discontinuous transmission information.

Clause 13. The method of clause 11 wherein the providing the discontinuous reception or discontinuous transmission information to the mobile device includes providing the discontinuous reception or discontinuous transmission information in one or more system information blocks (SIBs).

Clause 14. The method of clause 11 further comprising: providing cell load information to a network server; and receiving the discontinuous reception or discontinuous transmission information from the network server.

Clause 15. The method of clause 11 further comprising utilizing an orthogonal frequency division multiplexed (OFDM) signal for performing the radio frequency sensing operations with the mobile device.

Clause 16. A method for performing bistatic radio frequency sensing operations in a tracking mode, comprising: receiving discontinuous reception or discontinuous transmission information for a base station; determining one or more on periods and one or more off periods based on the discontinuous reception or the discontinuous transmission information; determining a duration of a radio frequency sensing tracking signal and a period of the radio frequency sensing tracking signal; determining a rate of interruption based at least in part on the period of the radio frequency sensing tracking signal and the one or more on periods and the one or more off periods based on the discontinuous reception or the discontinuous transmission information; and ceasing radio frequency sensing in the tracking mode in response to the rate of interruption exceeding a first threshold value or the duration of the radio frequency sensing tracking signal exceeding a second threshold value.

Clause 17. The method of clause 16 wherein the radio frequency sensing tracking signal utilizes phase continuity.

Clause 18. The method of clause 16 wherein the first threshold value is based on a time period between receiving radio frequency sensing tracking signals transmitted during the one or more on periods in the discontinuous transmission information.

Clause 19. The method of clause 16 wherein the second threshold value is based on a duration of the one or more on periods defined in the discontinuous reception or discontinuous transmission information.

Clause 20. An apparatus, comprising: at least one memory; at least one transceiver; at least one processor communicatively coupled to the at least one memory and the at least one transceiver, and configured to: receive discontinuous reception or discontinuous transmission information for a wireless node; determine one or more on periods and one or more off periods based on the discontinuous reception or the discontinuous transmission information; perform radio frequency sensing operations with the wireless node during the one or more on periods; and cease the radio frequency sensing operations with the wireless node during the one or more off periods.

Clause 21. The apparatus of clause 20 wherein the at least one processor is further configured to receive the discontinuous reception or the discontinuous transmission information for the wireless node from a network server.

Clause 22. The apparatus of clause 20 wherein the at least one processor is further configured to receive the discontinuous reception or the discontinuous transmission information for the wireless node from the wireless node.

Clause 23. The apparatus of clause 20 wherein the at least one processor is further configured to receive one or more system information blocks (SIBs) including the discontinuous reception or the discontinuous transmission information for the wireless node.

Clause 24. The apparatus of clause 20 wherein the at least one processor is further configured to perform bistatic radio frequency sensing operations with a user equipment during the one or more off periods.

Clause 25. The apparatus of clause 24 wherein the at least one processor is further configured to: utilize a first radio frequency sensing waveform to perform the bistatic radio frequency sensing operations with the wireless node; and utilize a second radio frequency sensing waveform to perform the bistatic radio frequency sensing operations with the user equipment.

Clause 26. The apparatus of clause 20 wherein the at least one processor is further configured to perform monostatic radio frequency sensing operations during the one or more off periods.

Clause 27. The apparatus of clause 20 wherein the at least one processor is further configured to perform bistatic radio frequency sensing operations with a base station during the one or more off periods.

Clause 28. The apparatus of clause 20 wherein the at least one processor is further configured to perform radio frequency sensing in an object detection mode.

Clause 29. The apparatus of clause 28 wherein the at least one processor is further configured to: compare the one or more on periods to a threshold duration period; and cease the radio frequency sensing operations in an object tracking mode during the one or more on periods in response to the one or more on periods being less than the threshold duration period.

30. An apparatus, comprising: at least one memory; at least one transceiver; at least one processor communicatively coupled to the at least one memory and the at least one transceiver, and configured to: provide discontinuous reception or discontinuous transmission information to a mobile device; perform radio frequency sensing operations with the mobile device during an on period included in the discontinuous reception or discontinuous transmission information; and cease the radio frequency sensing operations during an off period included in the discontinuous reception or discontinuous transmission information.

Clause 31. The apparatus of clause 30 wherein the at least one processor is further configured to broadcast the discontinuous reception or discontinuous transmission information.

Clause 32. The apparatus of clause 30 wherein the at least one processor is further configured to provide the discontinuous reception or discontinuous transmission information in one or more system information blocks (SIBs).

Clause 33. The apparatus of clause 30 wherein the at least one processor is further configured to: provide cell load information to a network server; and receive the discontinuous reception or discontinuous transmission information from the network server.

Clause 34. The apparatus of clause 30 wherein the at least one processor is further configured to utilize an orthogonal frequency division multiplexed (OFDM) signal to perform the radio frequency sensing operations with the mobile device.

Clause 35. An apparatus, comprising: at least one memory; at least one transceiver; at least one processor communicatively coupled to the at least one memory and the at least one transceiver, and configured to: receive discontinuous reception or discontinuous transmission information for a base station; determine one or more on periods and one or more off periods based on the discontinuous reception or the discontinuous transmission information; determine a duration of a radio frequency sensing tracking signal and a period of the radio frequency sensing tracking signal; determine a rate of interruption based at least in part on the period of the radio frequency sensing tracking signal and the one or more on periods and the one or more off periods based on the discontinuous reception or the discontinuous transmission information; and cease radio frequency sensing in a tracking mode in response to the rate of interruption exceeding a first threshold value or the duration of the radio frequency sensing tracking signal exceeding a second threshold value.

Clause 36. The apparatus of clause 35 wherein the radio frequency sensing tracking signal utilizes phase continuity.

Clause 37. The apparatus of clause 35 wherein the first threshold value is based on a time period between receiving radio frequency sensing tracking signals transmitted during the one or more on periods in the discontinuous transmission information.

Clause 38. The apparatus of clause 35 wherein the second threshold value is based on a duration of the one or more on periods defined in the discontinuous reception or discontinuous transmission information.

Clause 39. An apparatus for performing radio frequency sensing operations with a wireless node, comprising: means for receiving discontinuous reception or discontinuous transmission information for the wireless node; means for determining one or more on periods and one or more off periods based on the discontinuous reception or the discontinuous transmission information; means for performing radio frequency sensing operations with the wireless node during the one or more on periods; and means for ceasing radio frequency sensing operations with the wireless node during the one or more off periods.

Clause 40. An apparatus for performing radio frequency sensing operations with a mobile device, comprising: means for providing discontinuous reception or discontinuous transmission information to the mobile device; means for performing radio frequency sensing operations with the mobile device during an on period included in the discontinuous reception or discontinuous transmission information; and means for ceasing radio frequency sensing operations during an off period included in the discontinuous reception or discontinuous transmission information.

Clause 41. An apparatus for performing bistatic radio frequency sensing operations in a tracking mode, comprising: means for receiving discontinuous reception or discontinuous transmission information for a base station; means for determining one or more on periods and one or more off periods based on the discontinuous reception or the discontinuous transmission information; means for determining a duration of a radio frequency sensing tracking signal and a period of the radio frequency sensing tracking signal; determining a rate of interruption based at least in part on the period of the radio frequency sensing tracking signal and the one or more on periods and the one or more off periods based on the discontinuous reception or the discontinuous transmission information; and ceasing radio frequency sensing in the tracking mode in response to the rate of interruption exceeding a first threshold value or the duration of the radio frequency sensing tracking signal exceeding a second threshold.

42. A non-transitory processor-readable storage medium comprising processor-readable instructions configured to cause one or more processors to perform radio frequency sensing operations with a wireless node, comprising code for: receiving discontinuous reception or discontinuous transmission information for the wireless node; determining one or more on periods and one or more off periods based on the discontinuous reception or the discontinuous transmission information; performing radio frequency sensing operations with the wireless node during the one or more on periods; and ceasing the radio frequency sensing operations with the wireless node during the one or more off periods.

Clause 43. A non-transitory processor-readable storage medium comprising processor-readable instructions configured to cause one or more processors to perform radio frequency sensing operations with a mobile device, comprising code for: providing discontinuous reception or discontinuous transmission information to the mobile device; performing radio frequency sensing operations with the mobile device during an on period included in the discontinuous reception or discontinuous transmission information; and ceasing the radio frequency sensing operations during an off period included in the discontinuous reception or discontinuous transmission information.

Clause 44. A non-transitory processor-readable storage medium comprising processor-readable instructions configured to cause one or more processors to perform bistatic radio frequency sensing operations in a tracking mode, comprising code for: receiving discontinuous reception or discontinuous transmission information for a base station; determining one or more on periods and one or more off periods based on the discontinuous reception or the discontinuous transmission information; determining a duration of a radio frequency sensing tracking signal and a period of the radio frequency sensing tracking signal; determining a rate of interruption based at least in part on the period of the radio frequency sensing tracking signal and the one or more on periods and the one or more off periods based on the discontinuous reception or the discontinuous transmission information; and ceasing radio frequency sensing in the tracking mode in response to the rate of interruption exceeding a first threshold value or the duration of the radio frequency sensing tracking signal exceeding a second threshold.

What is claimed is:

1. A method for performing radio frequency sensing operations with a wireless node, comprising:

obtaining at least one of discontinuous reception information or discontinuous transmission information for the wireless node;

determining one or more on periods and one or more off periods based on the at least one of the discontinuous reception information or the discontinuous transmission information;

performing radio frequency sensing operations with the wireless node during the one or more on periods;

ceasing radio frequency sensing operations with the wireless node during the one or more off periods; and during at least one of the one or more off periods, at least one of:

performing bistatic radio frequency sensing operations with at least one of a user equipment or a base station; or performing monostatic radio frequency sensing operations.

2. The method of claim 1 wherein the discontinuous reception information or the discontinuous transmission information for the wireless node is received from a network server.

3. The method of claim 1 wherein the discontinuous reception information or the discontinuous transmission information for the wireless node is received from the wireless node.

4. The method of claim 1 wherein the discontinuous reception information or the discontinuous transmission information for the wireless node is included in one or more system information blocks (SIBs).

5. The method of claim 1 wherein the method comprises performing bistatic radio frequency sensing operations with the user equipment during the one or more off periods, the method further comprising:

utilizing a first radio frequency sensing waveform for the performing radio frequency sensing operations with the wireless node; and utilizing a second radio frequency sensing waveform for the performing radio frequency sensing operations with the user equipment.

6. The method of claim 1 wherein the performing radio frequency sensing operations with the wireless node during the one or more on periods includes performing radio frequency sensing in an object detection mode.

7. The method of claim 6 further comprising:

comparing the one or more on periods to a threshold duration period; and ceasing the radio frequency sensing operations in an object tracking mode during the one or more on periods in response to the one or more on periods being less than the threshold duration period.

8. An apparatus, comprising:

at least one memory;

at least one transceiver;

at least one processor communicatively coupled to the at least one memory and the at least one transceiver, and configured to:

obtain at least one of discontinuous reception information or discontinuous transmission information for a wireless node;

determine one or more on periods and one or more off periods based on the at least one of the discontinuous reception information or the discontinuous transmission information;

perform radio frequency sensing operations with the wireless node during the one or more on periods;

cease the radio frequency sensing operations with the wireless node during the one or more off periods; and at least one of:

perform, during the one or more off periods, bistatic radio frequency sensing operations with at least one of a user equipment or a base station; or perform, during the one or more off periods, monostatic radio frequency sensing operations.

9. The apparatus of claim 8 wherein the at least one processor is further configured to receive the discontinuous reception information or the discontinuous transmission information for the wireless node from a network server.

10. The apparatus of claim 8 wherein the at least one processor is further configured to receive the discontinuous reception information or the discontinuous transmission information for the wireless node from the wireless node.

11. The apparatus of claim 8 wherein the at least one processor is further configured to receive one or more system information blocks (SIBs) including the discontinuous reception information or the discontinuous transmission information for the wireless node.

12. The apparatus of claim 8 wherein the at least one processor is further configured to:

utilize a first radio frequency sensing waveform to perform the bistatic radio frequency sensing operations with the wireless node; and utilize a second radio frequency sensing waveform to perform the bistatic radio frequency sensing operations with the user equipment.

13. The apparatus of claim 8 wherein the at least one processor is further configured to perform radio frequency sensing in an object detection mode.

14. The apparatus of claim 13 wherein the at least one processor is further configured to:

compare the one or more on periods to a threshold duration period; and cease the radio frequency sensing operations in an object tracking mode during the one or more on periods in response to the one or more on periods being less than the threshold duration period.

* * * * *